(12) United States Patent
Kitamura et al.

(10) Patent No.: US 6,750,446 B2
(45) Date of Patent: Jun. 15, 2004

(54) ULTRASONIC-WELDING APPARATUS, OPTICAL SENSOR AND ROTATION SENSOR FOR THE ULTRASONIC-WELDING APPARATUS

(75) Inventors: Kouta Kitamura, Kanagawa-ken (JP); Tadashi Takahara, Kanagawa-ken (JP); Kenji Ishikawa, Kanagawa-ken (JP); Novuo Takahashi, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 44 days.

(21) Appl. No.: 10/046,076

(22) Filed: Jan. 16, 2002

(65) Prior Publication Data

US 2002/0092994 A1 Jul. 18, 2002

(30) Foreign Application Priority Data

Jan. 17, 2001 (JP) .................................. 2001-009082
Jan. 18, 2001 (JP) .................................. 2001-009807
Jan. 29, 2001 (JP) .................................. 2001-020015

(51) Int. Cl.$^7$ ............................. G01D 5/34; B29C 65/08
(52) U.S. Cl. ................... 250/231.13; 156/64; 156/73.1; 156/580.1
(58) Field of Search ................... 250/231.13, 231.14; 156/64, 73.1, 580.1, 580.2, 362, 363; 219/612, 616, 617, 635, 647

(56) References Cited

U.S. PATENT DOCUMENTS 4,468,265 A * 8/1984 MacLaughlin et al. ....... 156/64
4,894,533 A * 1/1990 Abe et al. ............... 250/231.13
5,059,901 A * 10/1991 Van Voorhis .......... 250/231.13
5,497,080 A * 3/1996 Kim ...................... 250/231.14
5,557,101 A * 9/1996 Choi ..................... 250/231.13
5,828,060 A * 10/1998 Juniman ................ 250/231.13
5,858,142 A * 1/1999 Tully et al. ................... 156/64

FOREIGN PATENT DOCUMENTS

JP 58355 3/2001
JP 135063 5/2001

* cited by examiner

Primary Examiner—Diego Gutierrez
Assistant Examiner—Stanley J. Pruchnic, Jr.
(74) Attorney, Agent, or Firm—Sughrue Mion, PLLC

(57) ABSTRACT

An ultrasonic-welding apparatus, which can automatically achieve measurement of the face-deflection the work piece after welding and during the welding of work pieces, such as a reel for a magnetic tape. The ultrasonic-welding apparatus includes: a cradle, onto which two types of work pieces to be welded are mounted in piles, and which can rotate around an axis vertical to the welding surface of a workpiece to be welded; a welding horn, which carries out welding using ultrasonic vibration wherein the two work pieces are sandwiched by the cradle; and a transmission-type laser sensor which measures the fixed part of the work pieces, after welding, by the irradiation of laser light which runs parallel to the welding surface, wherein the workpieces are rotating on the cradle and the welding horn is apart from the work pieces.

6 Claims, 14 Drawing Sheets

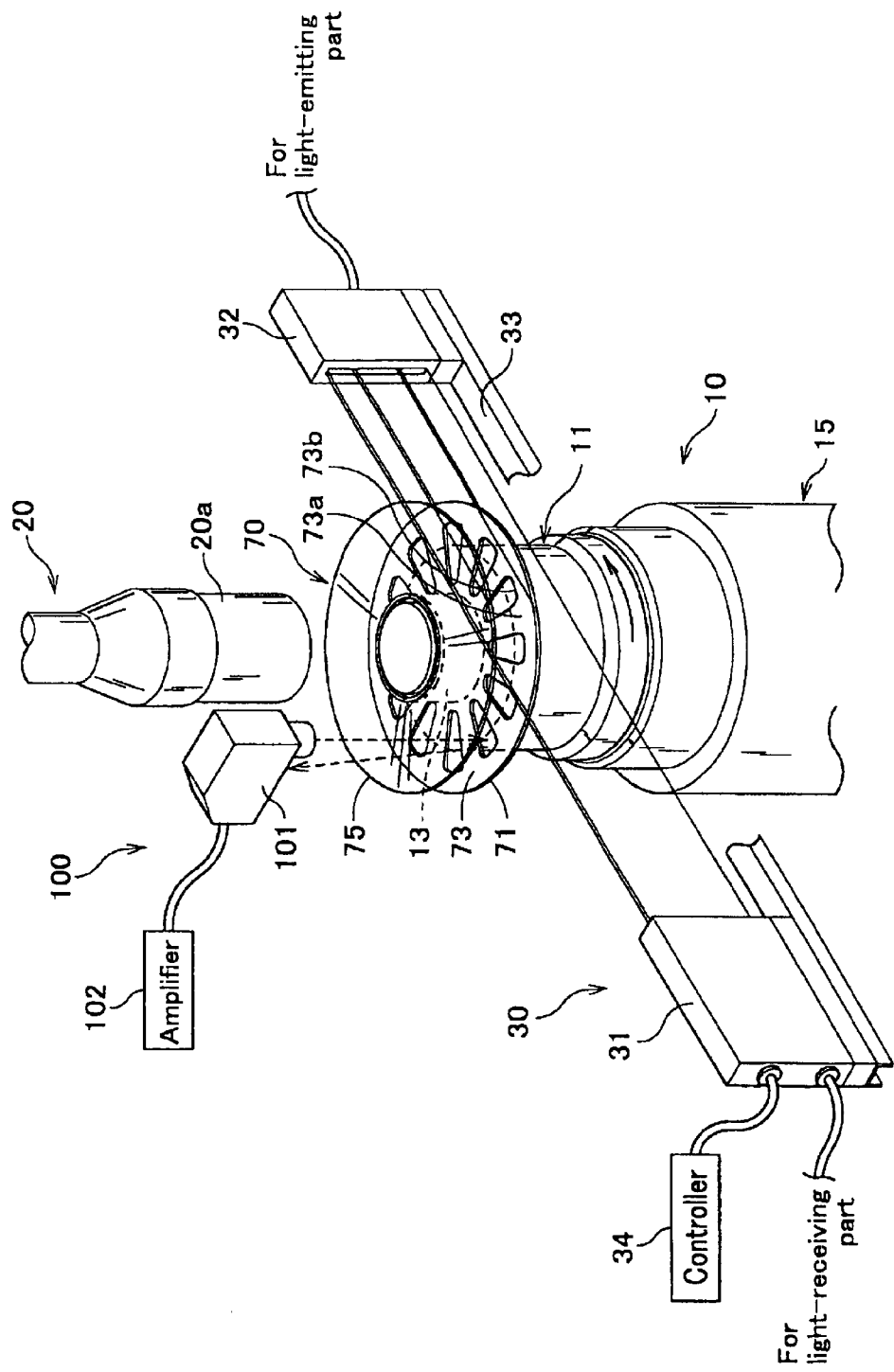

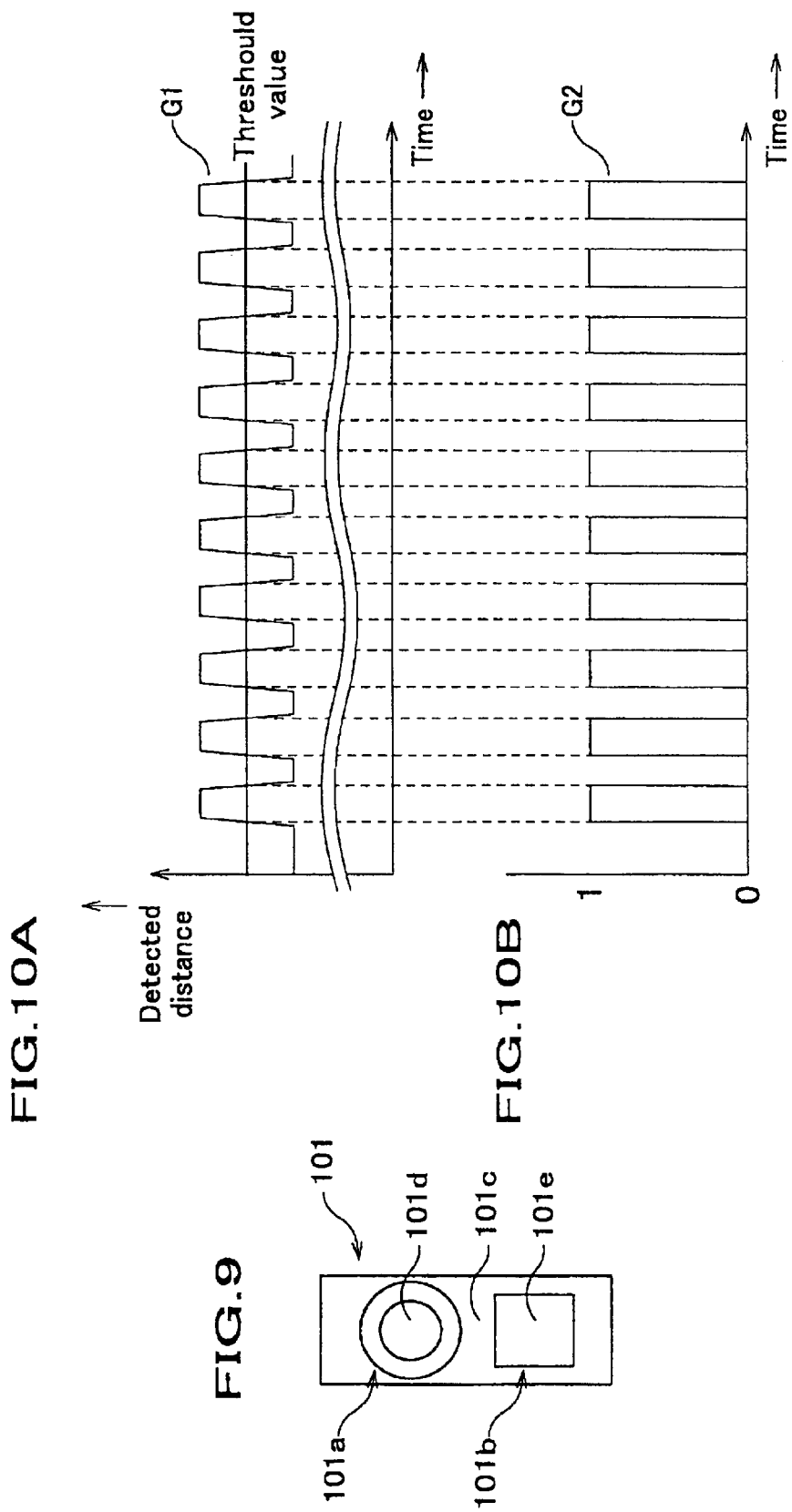

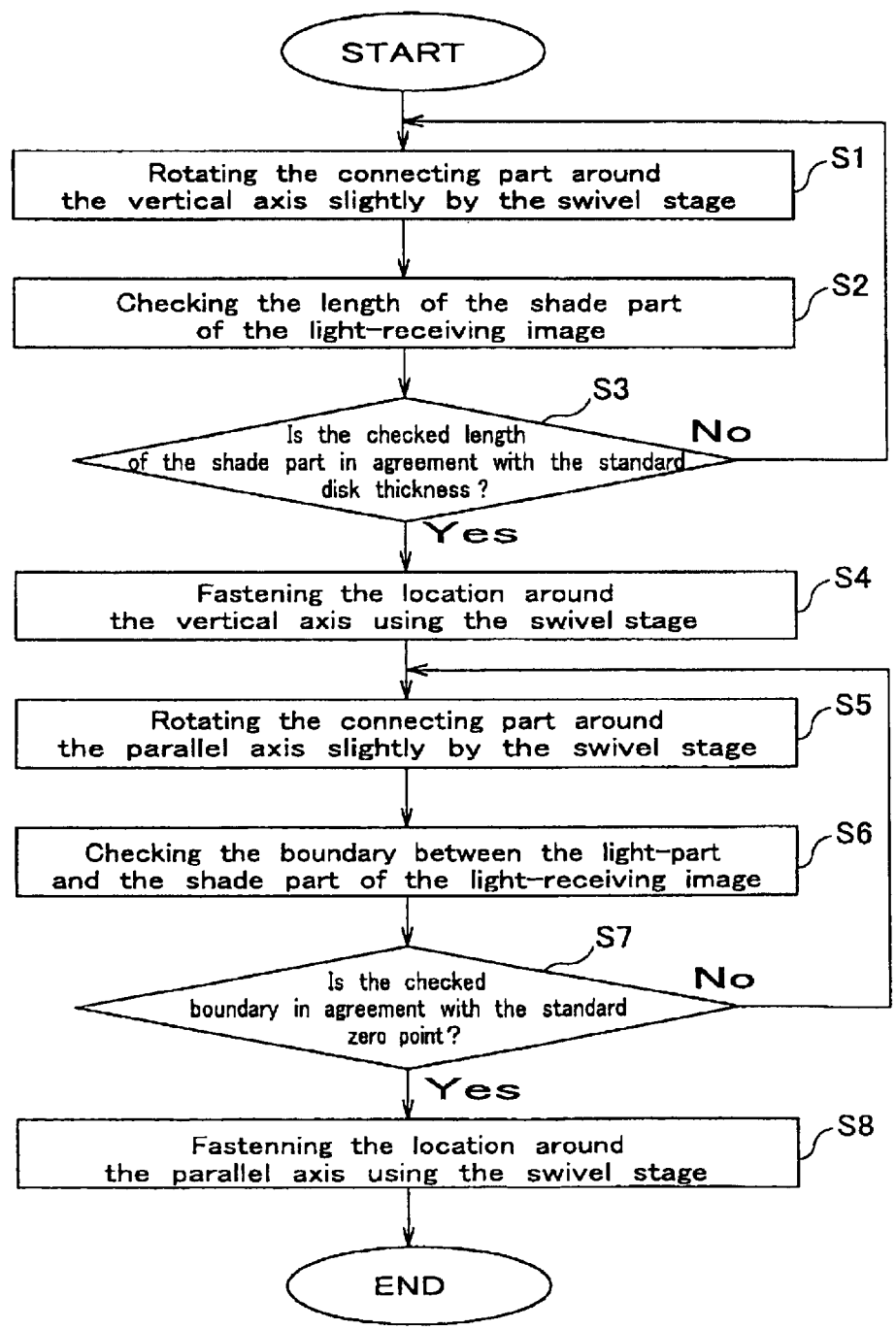

ULTRASONIC-WELDING APPARATUS, OPTICAL SENSOR AND ROTATION SENSOR FOR THE ULTRASONIC-WELDING APPARATUS

BACKGROUND OF THE INVENTION

1. Field of the Invention

The present invention relates to a ultrasonic-welding apparatus which can measure the face-deflection of work pieces, such as a reel joined by the ultrasonic-welding, and an optical sensor for ultrasonic-welding apparatus, a rotation sensor for ultrasonic-welding apparatus, and a location controlling method of the optical sensor for ultrasonic-welding apparatus.

2. Prior Art

Generally, a reel, onto which a magnetic tape is wound, is stored in the magnetic tape cartridge, which is used as recording medium such as a computer and videotape. The reel is formed by welding a reel hub and one flange together using the ultrasonic-welding apparatus. The reel hub is composed of a shaft, onto which a magnetic tape is wound, and other flange which are united together into an integral body.

Since the flange of the reel functions as a guide for winding a magnetic tape with sufficient accuracy, the parallelism between one flange and the flange of another side needs to be achieved with extreme precision. For example, in the case of the reel with a diameter of 100 mm, the face-deflection of a flange must be achieved within 0.18 mm. When the deflection of the dimension between both flanges is large, the problems, such as the imperfect winding, damaging on the edge of a magnetic tape, poor recording, and the tape jamming, may occurred.

Conventionally, the face-deflection of the flange of another side (located at the welded side) was measured along the following manner, specifically, after welding the flange of the another and the reel hub together by the ultrasonic-welding apparatus, the reel after welding is moved to the cradle from the welding apparatus for measurement. Then, the height of the top face of the flange of another side is measured with a dial gage on rotating the cradle. The distance between both flanges had been measured by the man power using a micrometer and the like. After recording the measured data on paper, these data were further inputted into a computer.

Since above described measurement works are carried by man power, great number of man-hours had been needed. Thus, two workers and much tact-time were required at each manufacturing line of reel. Since the measured data was inputted into a computer after once recording the measured data on paper, the operation of such works were complicated and there was also fear of the incorrect recording by posting or input mistake. Furthermore, the measuring apparatus of a face-deflection needed to be placed apart from the ultrasonic-welding apparatus, and the working space for the measuring apparatus is also required.

Therefore, automation of these measurement works has been desired. Still more preferably, it have been desired that the ultrasonic-welding apparatus which can continuously perform the operations from the welding to the face-deflection measurement of the work pieces on the condition where the work piece, such as reel, is mounted on the ultrasonic-welding apparatus.

Meanwhile, in order to measure the face-deflection of the work piece after welding with accuracy, the detection of the location of a work piece is required. For achieving this detection, an optical sensor, such as a transmission-type laser sensor, may be used.

Generally, an optical sensor is composed of a light-emitting device and a light-receiving device. When arranging the optical sensor on the cradle for the face-deflection measurement, the location of the light-emitting device and the light-receiving device is determined at both sides of the reel so that the reel is located between the light-emitting device and the light-receiving device. That is, location of the light-emitting device and the light-receiving device is determined so that the run direction of the laser light and the central axis of the light-receiving image should become parallel and perpendicular to the receiving surface of the cradle, respectively.

When the laser light is emitted from the light-emitting device to the region, where the one flange and the another flange of the reel are contained, while the cradle onto which the reel is mounted is rotating, the flange part of the light-receiving image becomes shade. The face-deflection of the reel thus will be detected by checking the change of the shade of the light-receiving image in the perimeter of the reel.

In the conventional optical sensor arranged on the cradle for the face-deflection measurement, however, the location of the light-emitting device and the light-receiving device was not adjusted after arrangement. When the optical sensor is simply arranged on the ultrasonic-welding apparatus for automating the operation from the welding to the face-deflection measurement, therefore, the displacement of the location of the light-emitting device and the light-receiving device may be caused by the vibration of the ultrasonic-welding apparatus.

As a result of the displacement of the location, the run direction of the laser light becomes less parallel to the receptacle side of the cradle. The central axis of the light-receiving image becomes less perpendicular to the receptacle side of the cradle. The physical relationship between the flange of the reel mounted on the cradle and the light-emitting device and/or the light-receiving device thus will be changed from the initial physical relationship of those.

Consequently, the displacement between the detected face-deflection, which is detected by the transmission-type laser sensor, and the actual face-deflection of the reel will be arisen, and the detection accuracy of the face-deflection of the reel thus will be dropped. Therefore, there has been required an optical sensor which does not cause such problems even if it is applied to the ultrasonic-welding apparatus, i.e., the optical sensor for an ultrasonic-welding apparatus.

Moreover, since a cover for preventing the dispersion of the noise accompanying the ultrasonic excitation or the dust under welding is arranged on the ultrasonic-welding apparatus so that the part related to the welding, the work pieces mounted on the cradle will be covered. Thus the visual checking whether or not the reel is rotating normally during face-deflection measurement cannot be carried out.

For checking the rotation of the reel in this case, the arrangement of the rotation sensors, such as a rotary encoder, is required. When the rotation sensor is arranged into the ultrasonic-welding apparatus, arrangement of the rotation sensor near the rotors, such as the reel, may be disturbed depending on the composition of the ultrasonic-welding apparatus. Furthermore, when a rotation sensor is arranged within the adverse environment, in which dust or the like is contained, such as inside of the ultrasonic-welding apparatus, the durability of the rotation sensor may be fallen.

Therefore, there has been required that the rotation sensor for ultrasonic-welding apparatus which can detect the rotation of the work piece even if the location of the rotation sensor is distant from the work pieces, that is, the location where does not affected by the environmental condition.

SUMMARY OF THE INVENTION

The first object of the present invention is to provide the ultrasonic-welding apparatus, which can attain the above-mentioned requirement, and which can automatically achieve both measurement of the face-deflection the work piece after welding and the welding of work pieces, such as a reel for a magnetic tape.

Moreover, the second object of the present invention is providing the optical sensor for the ultrasonic-welding apparatus, which can achieve the measurement of the face-deflection a work piece without dropping the measurement accuracy, and providing the adjustment method of the optical sensor.

Furthermore, the third object of the present invention is to provide the rotation sensor for the ultrasonic-welding apparatus, which can detect the rotation of the work piece from the position distant from the work piece.

According to the present invention, which attains these objects, there is provided an ultrasonic-welding apparatus comprising; a cradle, onto which two work pieces of to be welded and for welding are mounted in piles, and which can rotate around the axis vertical to the welding surface of said work piece of to be welded; a welding hone which carries out a welding using a supersonic in the condition of having sandwiched the two work pieces between said cradle; and a transmission-type laser sensor which measures the fixed part of the work pieces of after welding by the irradiation of the laser light which runs parallel to said welding surface, and said transmission-type laser sensor measures the fixed part of the work piece after welding, which is rotating on the cradle, in the condition that said welding hone is apart from the work piece of after welding.

In the present invention, the ultrasonic-welding apparatus, in which the operations of the face-deflection measurement of the work piece after welding and the ultrasonic-welding can be carried out, is supplied. In this apparatus, since the welding horn leaves from the work piece after welding, the work piece of after welding will be in free condition. Thus, when the laser light, which runs parallel to the welding surface of the work, is irradiated to the work pieces from side direction while rotating the work piece centering on the axis vertical to the welding surface by rotating the cradle, the location and the dimension of the work piece can be measured. As described above, since the work piece is rotating, when the measurement of the fixed position is carried out along the circumference of the work piece, the measurement of the face-deflection, which is caused by the welding will be carried out. Since the work piece is rotating, the face-deflection of the work pieces which is caused by the welding will be measured by measuring the fixed position along the circumference of the work pieces.

According to the rotation sensor of the present invention, which attains above described objects, there is provided a rotation sensor for ultrasonic-welding apparatus, which detects the rotation of a rotor comprising; light-emitting means, which emits a light to a detecting object which rotates with the rotation of said rotor, and light-receiving means, which receives the light emitted from said light-emitting means.

In the present invention of the rotation sensor, the light emitted from the light-emitting means is reflected or penetrated at the detecting part, and the light affected by the detecting part is received at the light-receiving part. Since the position of the detecting part is varied by the rotation while receiving light, time unit until the light, which is reflected by the detecting part, is received, and time unit during light-receiving/non-receiving of the light, which penetrated the detecting part, is received are changed. Thus, the rotation of the rotor is detected by the change of these time units.

According to the adjusting method of the optical sensor for an ultrasonic-welding apparatus, which adjusts the location of said optical sensor having light-emitting means, which emits a light to a detecting object, and light-emitting means, which receives the light emitted from said light-emitting mean, wherein an adjusting member which interrupts the part of the light emitted from the light-emitting means is arranged, and forms the light-receiving image affected by said adjusting member using the light which is received at said light-receiving means, the method comprising the step of: a first adjusting process, in which the light-emitting means and the light-receiving means are moved around the axis vertical to the light emitting direction, and adjusts the location of the light-emitting means and the light-receiving means based on the light-receiving image which is changed by the movement of the light-emitting means and the light-receiving means; a second adjusting process, in which the light-emitting means and the light-receiving means are moved around the axis parallel to the light emitting direction, and adjusts the location of the light-emitting means and the light receiving means based on the light-receiving image which is changed by the movement of the light-emitting means and the light-receiving means.

In the present invention, the light-receiving image affected by the adjusting member is formed by receiving the light, which is interrupted or reflected by the adjusting member. With the first adjusting process, the change of the thickness of the adjusting member by the variation of the light-receiving image is detected, and the position around the axis vertical to the light emitting direction of the light-emitting means and the light-receiving means to the adjusting member is adjusted. Then, with the second adjusting process, the change of the limit position of the adjusting member is detected by the variation of the light-receiving image, and the position around the axis parallel to the light emitting direction of the light-emitting means and the light-receiving means to the adjusting member is adjusted.

BRIEF DESCRIPTION OF THE DRAWINGS

FIG. 8 is a perspective view of showing the appearance that the rotation sensor 100 according to the present invention is installed in the ultrasonic-welding apparatus 1.

FIG. 9 is a front view showing the sensor unit 101 of a reflection-type laser sensor device 100.

FIG. 10A is a graph showing the result of measurement of the reel rotation using a reflection-type laser sensor device 100, and especially showing the result of the measurement in the case that the parameter is detection distance—time: graph G1.

FIG. 10B is a graph showing the result of measurement of the reel rotation using a reflection-type laser sensor device 100, and especially showing the result of the measurement in the case that the parameter is detection/not detection of the depression—time: graph G2.

FIG. 15 is a flow chart explaining the method for adjusting the location of the light-emitting part 31 and the light-receiving part 32 of the transmission type laser sensor device 30.

DESCRIPTION OF THE PREFERRED EMBODIMENT

The preferred embodiment of the present invention will be explained in detail with referring to the attached drawings.

<<Ultrasonic-welding Apparatus>>

In the ultrasonic-welding apparatus according to the present invention, the operation from the welding of work pieces to the measurement of the face-deflection of the work pieces of after welding is continuously achieved on the condition that the work piece is mounted on the ultrasonic-welding apparatus.

A work piece is defined as the reel placed in the magnetic tape cartridge used as recording medium, such as a computer, videotape, or the like. When the reel is manufactured using the ultrasonic-welding apparatus of present invention, since the operation from the welding of the reel to the measurement of the face-deflection of the reel of after welding is consistently achieved, the reel having the parallelism between one flange and another flange with certain accuracy is manufactured efficiently.

[Reel]

Figure 4:
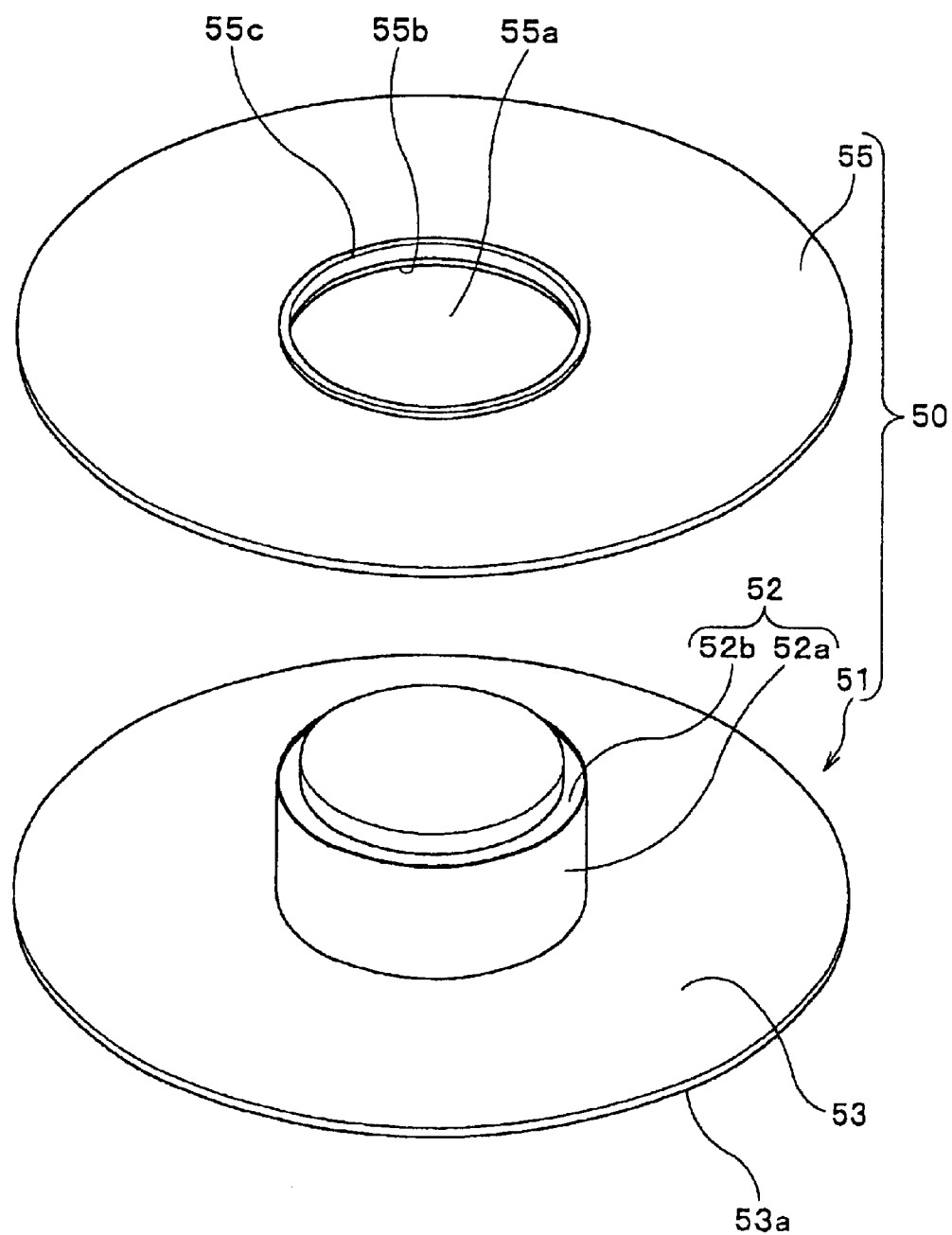
FIG. 4 is an exploded perspective view of a reel 50 placed in a magnetic tape cartridge.

The construction of a reel 50 used in the ultrasonic-welding apparatus according to the present invention will be explained with referring to FIG. 4. FIG. 4 is an exploded perspective view of the reel, which is placed in a magnetic tape cartridge. As shown in FIG. 4, the reel 50 is composed of an upper reel 51 and a lower reel 55, which are welded together. With FIG. 4, the upper reel 51 is illustrated to the down side for agreeing with the reel illustrated in other figures.

Figure 3:
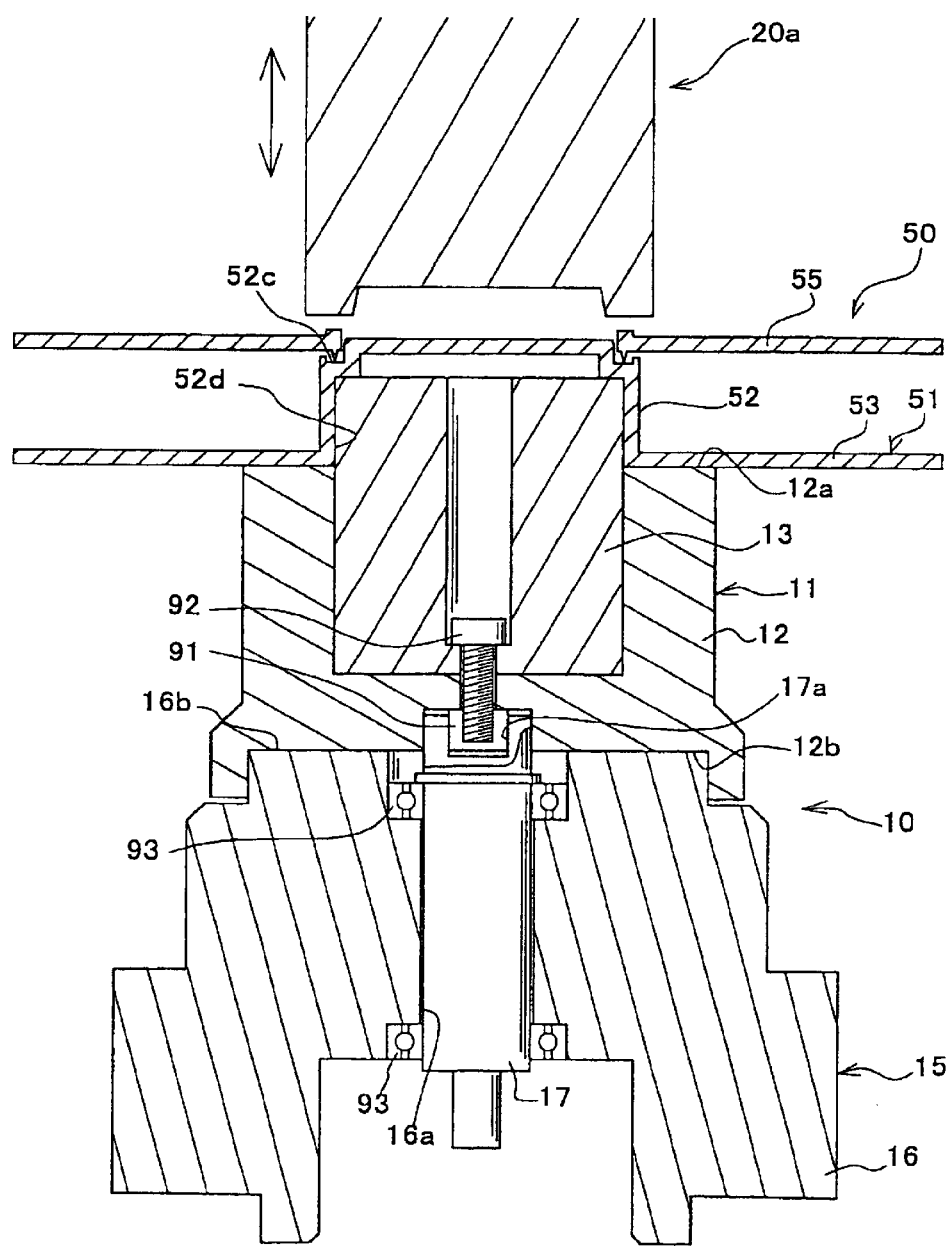
FIG. 3 is a sectional view at the vertical direction of the cradle 10 and the welding unit 20 of the ultrasonic-welding apparatus 1 according to the present invention.

The upper reel 51 is composed of a reel hub 52 onto which a magnetic tape is wound and having the cylindrical bottomed shape, and a flange part 53 protruded from the upper end periphery of the reel hub 52 toward the diameter direction. The reel hub 52 and the flange part 53 are united together into an integral body by means of resin. At the lower part of cylindrical part 52a of the reel hub 52, a smaller cylinder (step part), which has one size smaller diameter than the cylindrical part 52a is formed. A contacting part 52b which is used at the time of welding is formed at the side wall part of the step part. As shown in FIG. 3, the bottomed recessed part of the reel hub 52 is opened upwardly (lower part side in FIG. 4.).

The lower reel 55 has the shape of disk, and a circular opening 55a through which the smaller cylinder part is inserted is formed at the center thereof. The rib 55b for welding is provided among the upper surface of the edge part of the opening 55a. An annular rib 55c is provided protrudedly at the lower surface of the edge part of the opening 55a so that a welding horn 20a is pressed and receives the vibration of an ultrasonic wave, and transmits the pressure to the rib 55b at the time of ultrasonic-welding.

Figure 1:
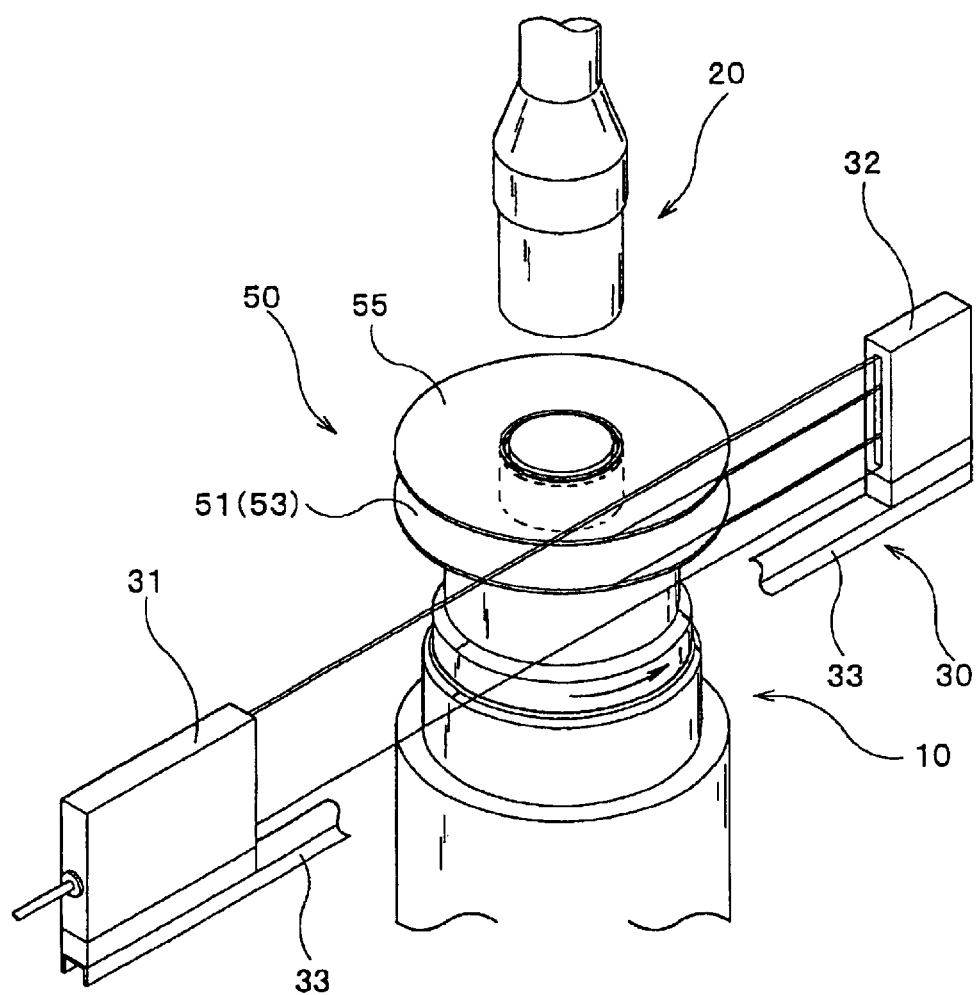
FIG. 1 is perspective view showing the ultrasonic-welding apparatus, which has the measurement function of a face-deflection.
Figure 2:
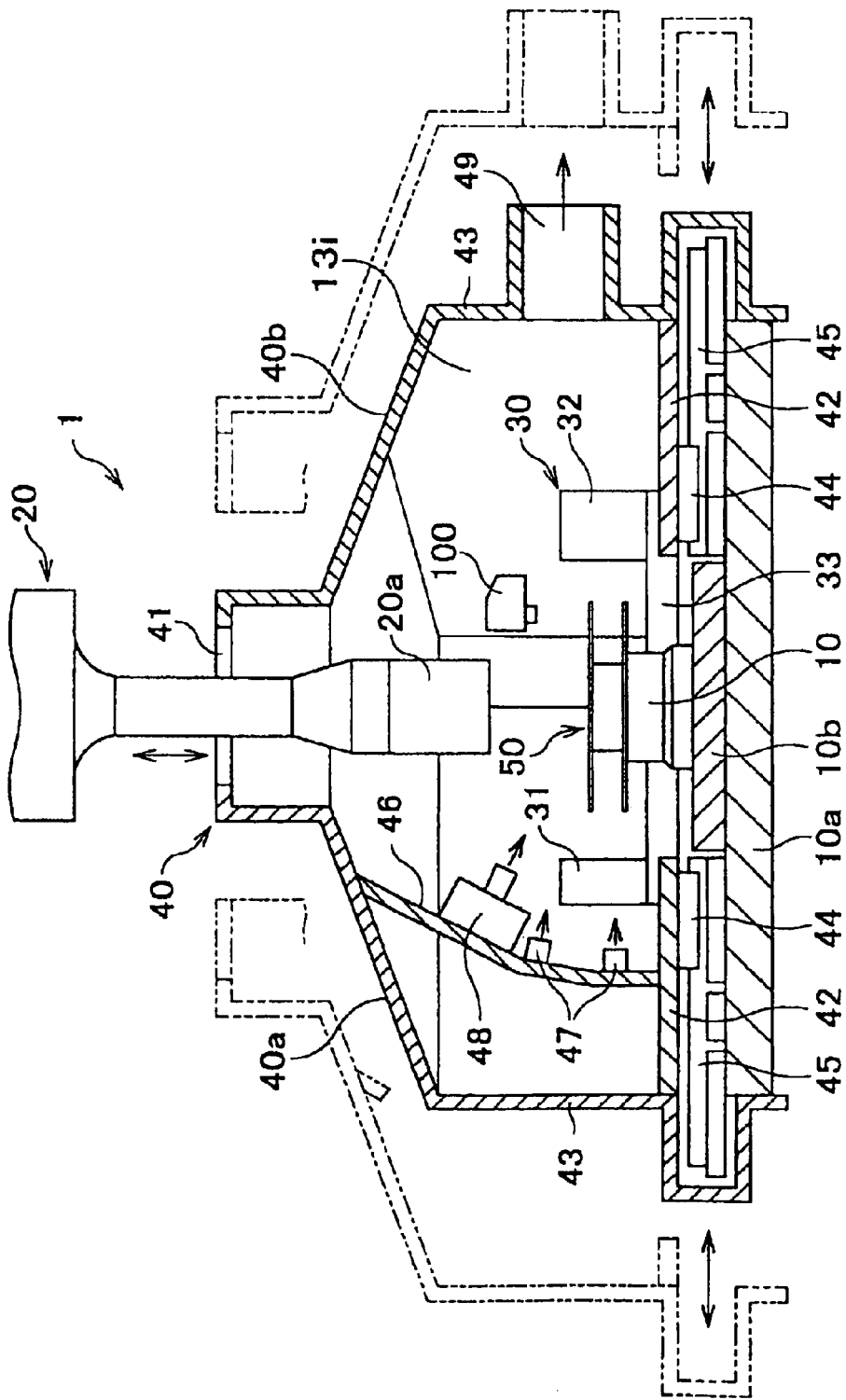
FIG. 2 is sectional view of the ultrasonic-welding apparatus 1 according to the present invention.

FIG. 1 is a perspective view of main part of the ultrasonic-welding apparatus 1, which has the measurement function of the face-deflection according to the present invention. FIG. 2 is sectional view of the ultrasonic-welding apparatus 1. FIG. 3 is a sectional view at the vertical direction of the cradle 10 and the welding unit 20 of the ultrasonic-welding apparatus according to the present invention.

In the ultrasonic-welding apparatus 1, the reel 50 is manufactured by welding the upper reel 51 and the lower reel 55 together using a an ultrasonic-wave. As shown in FIG. 2, the ultrasonic-welding apparatus 1 is composed of a cradle 10, a welding unit 20, a transmission-type laser sensor device 30, a cover 40, and a control unit (not shown).

[Cradle]

As shown in FIG. 3, the cradle 10 is composed of a rotating table 11 and a fixed table 15. The rotating table 11, onto which the reel 50 is mounted, is used as the fulcrum at the time of ultrasonic-welding, and also used as the measuring table at the time of the face-deflection measurement by its own rotation. The fixed table 15 is fixed to the table 10b (shown in FIG. 2) and supports the rotating table 11.

The rotating table 11 is composed of a mounting part 12, a positioning cylinder 13, a rotary joint 91, and a bolt 92. The mounting part 12 having the bottomed cylindrical shape receives the load supplied at the time of welding by supporting the flange side of the upper reel 51, and is mounted rotatably and slidably on the fixed table 15. The positioning cylinder 13 which is inserted into the inner cylinder of the mounting part 12 and used for the positioning by engaging with the inner cylinder surface 52d of the reel hub 52 of the reel 50. The rotary joint 91 which receive the rotation torque of the rotation axis 17 of the fixed table 15 using the spline or the key or the like. The bolts 92 combine these components integrally.

The fixed table 15 is composed of a base 16 and a rotation axis 17. The base 16 is fixed to the fixed system, such as a table 10b (shown in FIG. 2). The rotation axis 17 is rotatably supported by the radial ball bearing 93 and 93 within a hole 16a. The hole 16a, at the upper-and-lower side of which the radial ball bearing 93 and 93 are provided, respectively, is formed toward the perpendicular direction at the center of the base 16.

Since the cradle 10 having above described construction is used not as only a table for welding the reel 50 but as table for measuring the face-deflection of the reel 50, a mounting surface 12a of the mounting part 12, a bottom surface 12b of the rotating table 11, and a sliding surface 16b of the fixed table 15 are treated so as to having the very sufficient accuracy, respectively. The face accuracy of the mounting surface 12a thus serves about within 2 micrometers, on the condition that the rotating table 11 and the fixed table 15 are combined together. A bottom surface 12b and a sliding surface 16b, at which the sliding rotation of the rotating table 11 and the fixed table 15 are carried, is also treated so as to provide the same face accuracy.

In the conventional welding apparatus used for the reel manufacturing, the rotating table 11 is supported by the angular contact ball bearing, which can receive the load toward the radial and one direction of the axial direction, instead of the sliding rotation between the bottom surface 12b and the sliding surface 16b.

A joint opening 17, into which a rotary joint 91 is engaged, is provided at the upper end of the rotation axis 17. By the engagement of the rotary joint 91, a rotation torque is transmitted. A not drawn stepping motor or servo motor, which are actuated by the command signal from a control unit, is connected to the lower end of the rotation axis 17. Thus, when the face-deflection measurement is started, the rotating axis 17 is rotated by the stepping motor, for example, and then the rotating table 11 is rotated on the cradle 10.

In the present preferred embodiment, the rotating table 11 is composed of four components for enabling the application to the work piece of other kinds. For example, the rotating table 11 may be composed integrally. That is, any type of the constructions of the rotating table 11 may be acceptable as long as the mounting surface 12a of the rotating table 11 can be rotated around the axis perpendicular to the welding surface with sufficient rotation accuracy.

[Welding Unit]

As shown in FIGS. 1 and 2, a welding horn 20a is provided at the end part of a welding unit 20 toward the cradle 10. The welding of the lower reel 55 and the upper reel 51 together is achieved using the frictional heat on the condition that the reel 50 is sandwiched between the welding horn 20a and the cradle 10. The friction heat used in this welding is caused by the vibration between the lower reel 55 and the upper reel 51, which is caused by the welding horn. The welding horn 20a has a diameter which contacts annular rib 55c of a reel 50, and the operations of which, such as the ups and downs of the welding horn 20a, the generation of an ultrasonic wave, and the press, are carried out by the command signal from the not drawn control unit connected to the welding horn 20a.

[Transmission-type Laser Sensor]

As shown in FIGS. 1 and 2, a transmission-type laser sensor device 30 is composed of a light-emitting part 31 and a light-receiving part 32, and which are arranged face to face each other.

In the transmission-type laser sensor device 30, when some kind of objects are exist between the light-emitting part 31 and the light-receiving part 32, the shadows of the objects are detectable in the light-receiving part 32. The presence or absence of objects, and a position and a dimension of objects thus can be measured by this transmission-type laser sensor device 30.

In the ultrasonic-welding apparatus 1 according to the present preferred embodiment, for measuring the face-deflection of the reel 50 which are formed by the welding, the location of the light-emitting part 31 and the light-receiving part 32 are determined at both sides of the reel 50. In this location, the laser light, which is irradiated toward the same height range as the height of the contacting part 52b(welding surface), and light flux of which has a face parallel to the rotation axis 17 of the said cradle 10, and which runs parallel to the welding surface, can be irradiated.

In the preferred embodiment of the present invention, the transmission-type laser sensor device 30 is arranged so that laser light irradiated from the light-emitting part 31 will pass through the constant position near the periphery of the flange part 53 and the lower reel 55 of the reel 50.

[Cover]

As shown in FIG. 2, the cover 40 is arranged openably so that all the ranges where welding is performed will be covered thereby. The cover 40 prevents the dispersion of dust and the noises of the supersonic wave at the time of welding. At the inside of the cover 40, an air blasting mechanism for removing the dust adhering to the reel 50, and a dust collecting mechanism, which collects the removed dust and exhausting it to outside are further provided.

The cover 40 has the rectangular shape in plane viewing and is composed of a left-side cover 40a and a right-side cover 40b. An opening 41 for enabling the upward-and-downward movement of the welding unit 20 is provided at the upper end of the cover 40. The left-side cover 40a and the right-side cover 40b are slidably constructed for preventing the dispersion of dust and noise. When welding or face-deflection measurement is under going, the left-side cover 40a and the right-side cover 40b are closed, and thus noise insulation and dust corrections are achieved.

A sole plate 42 and 42 are horizontally disposed at the bottom portion of the left-side cover 40a and right-side cover 40b, respectively. A peripheral wall 43 and 43 are perpendicularly disposed at the side edge part of the sole plate 42. A sliding member 44 and 44 are disposed at the bottom part of the sole plate 42. A guide 45 and 45 which are prolonged in the right-and-left direction (opening-and-closing direction of the cover 40) are laid on the upper surface of the both side part of the base 10a, and with which the sliding member 44 and 44 are slidably engaged. A cylinder (not shown), by which the left-side cover 40a and the right-side cover 40b are moved to opening-and-closing direction, is arranged between the base 10a and the left-side cover 40a or the right-side cover 40b.

The left cover 40a has an inwall 46 therein. A pair of air nozzles 47 and 47 for spraying pressurized air toward welding area are arranged on the inwall 46. An electricity remover 48 for removing the electricity by spraying an air containing an ion toward welding area of above the air openings 47, 47 is also arranged on the inwall 46. A suction hole 49, to which the suction pump (not shown) is connected, and which discharges the air in the cover 40, and which has a cylindrical shape, is arranged at the peripheral wall 43. At the inward of the right-side cover 40b, a guide plate 13 for leading the air to the suction hole 49 is provided aslant toward the suction hole 49.

[Control Unit]

In the ultrasonic-welding apparatus 1 of the present preferred embodiment, it is defined that the operation of the ultrasonic-welding apparatus 1 can be operated through the operator panel of the control unit (not shown). A switches for the automatic operation of the apparatus, such as the ups-and-downs operation of the welding horn 20a, the rotating operation of the cradle 10, and the operation of the face-deflection measurement using the transmission-type laser sensor, and so on, is provided on the operator panel. Lamps for indicating the judgement of OK(all right) or NG(no good) after measurement is also provide on the operator panel.

[Function]

The above described ultrasonic-welding apparatus which has the measurement function of the face-deflection, attains the subject of the present invention by acting with following manner.

Before operating the ultrasonic-welding apparatus 1, the inclination of the transmission-type laser sensor device 30 is finely adjusted by the operation of fine-adjusting devices, such as a swivel stage, so that the laser light, light flux of which forms a face parallel to the rotation axis 17, and which runs parallel to the welding surface, can be irradiated. With the present preferred embodiment, the inclination of the transmission-type laser sensor device 30 is adjusted so that the light flux of the laser light forms a face parallel to the rotation axis 17, however, it may be acceptable that the inclination of the transmission-type laser sensor device 30 is set at a fixed inclined angle as long as it is always used at the same inclined angle.

When manufacturing of the reel 50 is started, the left-side cover 40a and right-side cover 40b are opened by the operation through the control unit. Then, the reel hub 52 of the upper reel 51 is engaged with the periphery of the positioning cylinder 13. Thus, the upper reel 51 is mounted on the cradle 10. The opening 55a of the lower reel 55 is engaged onto the reel hub 52 so that the contacting part 52b of the upper reel 51 and the rib 55b of the lower reel 55 are contacted each other. The setting of the lower reel 55 to the upper reel 51 is thus achieved.

The left-side cover 40a and right-side cover 40b are closed by the operation through the control unit. Then welding using the ultrasonic-welding apparatus 1 is started. With the ultrasonic-welding apparatus 1, the welding horn 20a is sent downward according by the command of the programmed, the welding horn 20a is thus directly contacted with the annular rib 55c of the reel 50, and presses down the lower reel 55 toward the upper reel 51. Finally, the supersonic wave of predetermined frequency is applied from the welding horn 20a for a predetermined time, and thus the contacting part 52b and rib 55b are welded together by the frictional heat caused by the friction between them.

After finishing the welding, the welding horn 20a is sent upward and leaves from the reel 50. Then, the laser light is irradiated toward the direction parallel to the welding surface from the light-emitting part 31, while rotating the rotating table 11 centering on the rotation axis 17, which is perpendicularly located to the welding part. Part of the laser light irradiated towards the reel 50 is interrupted by the reel 50, and thus the laser light, part of which is interrupted, is received at the light-receiving part 32, and the face-deflection of the reel 50 is detected based on the received laser light.

Figure 5:
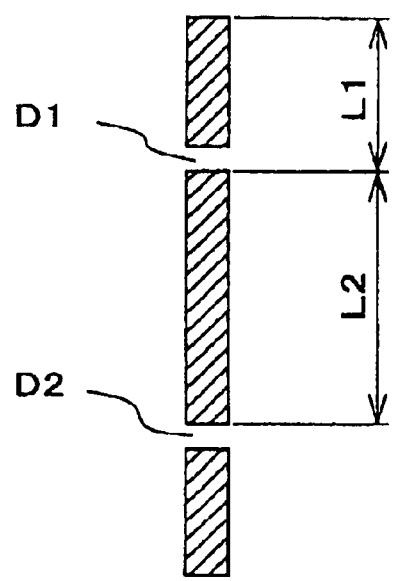
FIG. 5 is an explaining view of showing the light-receiving pattern of the laser received at the light-receiving part 32.

FIG. 5 is an explaining view of showing the light-receiving pattern of the laser light received at the light-receiving part 32. With FIG. 5, the portion expressed with diagonal line is corresponding to received laser light. As shown in FIG. 5, in the light-receiving part 32, the portion by which laser light is interrupted by the lower reel 55 was detected as a shade D1, and the portion by which laser light was interrupted by the flange part 53 is detected as a shade D2.

In the transmission-type laser sensor device 30, the distance L1 from the upper limit of a light-receiving pattern to the lower limit of the shade D1 and the distance L2 from the lower limit of a shade D1 to the upper limit of a shade D2 is calculated. This calculation is continuously performed while the reel 50 is rolled into a 360-degree roll. Thus, the change of width L1 is outputted as the face-deflection. Also, the value of L2 is outputted as a dimension, and the change of width L2 is outputted as a deflection of flange spacing.

When the value of the face-deflection, the dimension and the width between the flanges of the reel 50 are larger than the predetermined value, the reel 50 is judged as substandard, and the NG lamp is turned on. On the other hand, when the values of them are smaller than the predetermined value, the OK lamp is turned on. Then, the cover 40 is opened, the reel 50 is taken out, and the welding of the following work pieces are repeated similarly. Along above described manner, in the ultrasonic-welding apparatus 1 according to the present preferred embodiment, welding of the work pieces is achieved, and the measurement of the face-deflection and dimension of the vicinity part of the welding surface can be achieved.

In the ultrasonic-welding apparatus according to the present preferred embodiment, the rotating table 11 is supported by not the angular contact ball bearing but the comparatively large face, an area of which is larger than welding surface, such as the sliding surface 16b which is finished with sufficient accuracy. The cradle 10 used in welding thus may be used as the measuring table at the time of the face-deflection measurement. Then a series of operations from welding of the work pieces to the face-deflection measurement of the work piece of after welding can be carried out by the same ultrasonic-welding apparatus, the number of operators required for this series of the operation thus can be reduced.

Since the face-deflection and the dimension of the work pieces are measured by irradiating the laser light which runs parallel to the welding surface using the transmission-type laser sensor device 30, the transmission-type laser sensor device 30 can be established in the both side of the work piece. The operations, such as the mounting and dismounting of the work piece, are not disturbed. Therefore, the manufacturing of the work piece can be carried out without giving damage thereon.

When the reel 50 for the magnetic tape is manufactured, the measurement of the face-deflection about the flange and the measurement of the distance between both flanges can be carried out simultaneously. According to the present preferred embodiment, since the tact time, which was conventionally required for 44 seconds, is shortened to 17 seconds, the productive efficiency is sharply improved.

In the conventional manner, measurement and the input of the measurement result were carried out by manpower. On the other hand, in the present invention, since the measurement result can be digitized and measurement can be achieved automatically by using the devices, such as the laser sensor or the like, the exact and efficient measurement and data management can be achieved.

Since the manpower required for the series of the operations can be decreased to one person from two persons, the reduction of the employment and the workspace cost can be achieved. According to the present invention, the workspace conventionally required about 4 m$^2$ can be reduced to about 2.5 m$^2$.

As for the reel for a magnetic tape cartridge, especially, in order to manage the two geometric tolerance and dimensions of the face-deflection of the welded flange and the distance between flanges, when ultrasonic-welding apparatus 1 according to the preferred embodiment of the present invention is applied, the operation from the welding to the measurement can be performed very efficiently.

<Second Embodiment of the Ultrasonic-welding Apparatus>

Figure 6:
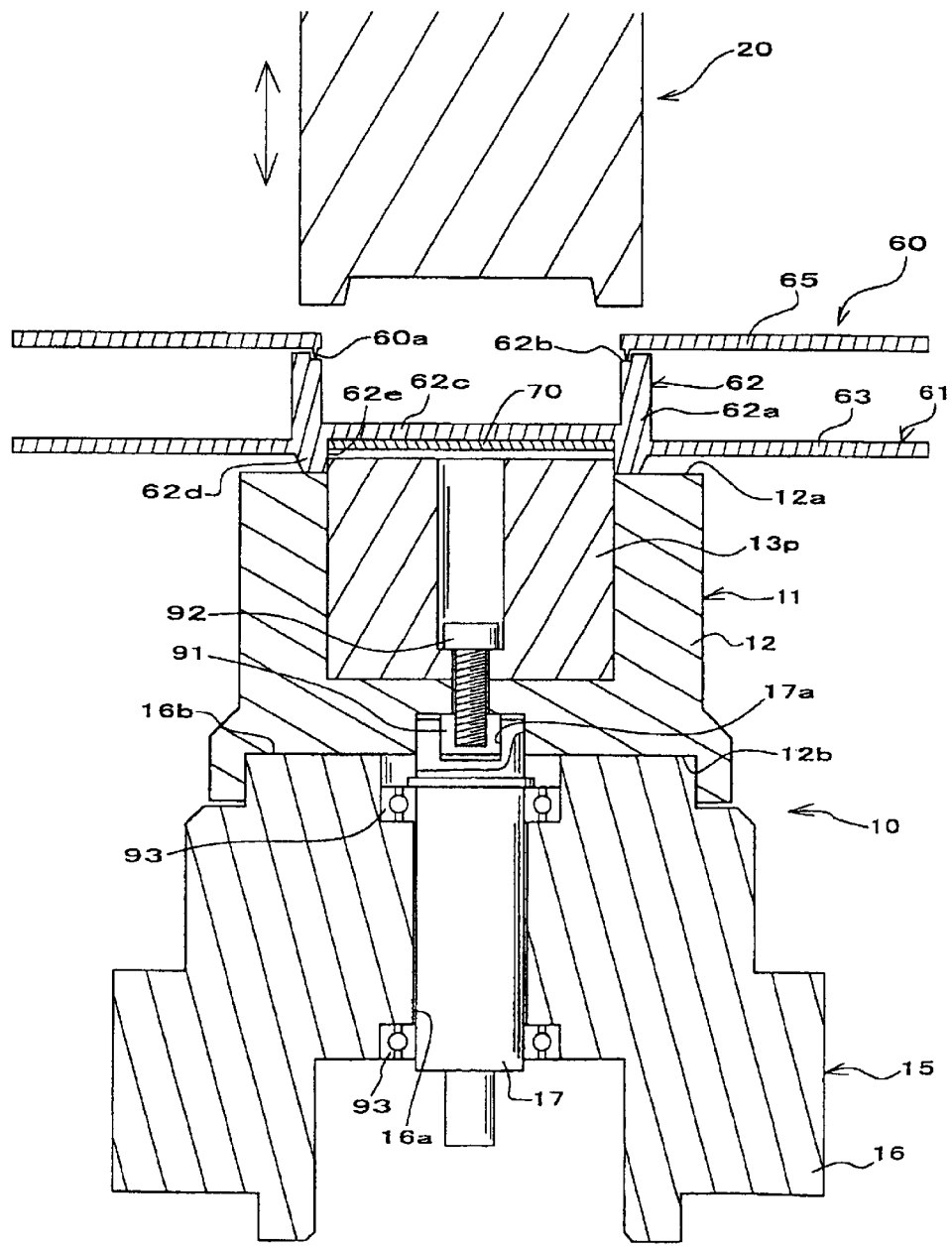
FIG. 6 is a sectional view of the ultrasonic-welding apparatus having mounted reel of other structures.

An embodiment where the ultrasonic-welding apparatus according to the present invention is applied to the reel of other structures will be explained as follows. FIG. 6 is a sectional view of the ultrasonic-welding apparatus having the mounted reel of other structures. With following explanation, the parts that are practically the same as those described above shall be indicated with the same symbols and detailed description thereof shall be omitted.

In the ultrasonic-welding apparatus shown in FIG. 6, a positioning cylinder 13p, which is consisted of a magnetic material having the magnetic force, is provided instead of the positioning cylinder 13 of the ultrasonic-welding apparatus of the first preferred embodiment of the present invention. Since the height of the positioning cylinder 13p is shorter than that of the positioning cylinder 13, the positioning cylinder 13p is provided on the condition that the upper end thereof is projected only few millimeters from the mounting surface 12a.

As shown in FIG. 6, a reel 60 as a processing object is composed of the upper reel 61 and a lower reel 65, which are welded together. The upper reel 61 is composed of a reel hub 62 and a flange part 63, which are united together into an integral body. The reel hub 62, onto which a magnetic tapes is wound, is formed in a bottomed cylindrical shape, and at the bottom part of the periphery of which the flange part 63 is protrudedly provided toward the radial direction thereof.

A contacting part 62b having the circular concave shape is formed along the inner periphery of the lower part of the cylindrical part 62a of the reel hub 62. A bottomed recessed part of the reel hub 62 is opened upwardly. A rib 62d protruded upward is provided along the upper surface periphery of the reel hub 62. A shallow recessed part 62e having the circular shape is provided at the upper surface side of the hub 62. As shown FIG. 6, a circular plate, such as a magnetic plate 70 consist of martensitic stainless steel, is engaged and fixed into the shallow recessed part 62e. The lower reel 65 has a disk-like shape and has a circular opening at the center thereof. A projection 60a, which is used as the melting portion at the time of welding, is protrudedly provided along the top-face periphery of the circular opening of the lower reel 65.

When the welding and the measurement of the reel 60 having the above construction are carried out, the magnetic plate 70 of the upper reel 61 is pulled to the positioning cylinder 13p only by bringing the upper reel 61 close to the top face of the rotating table 11. Since the magnetic plate 70 is pulled toward the positioning cylinder 13p by magnetic force, the inner periphery of the shallow recessed part 62e and the positioning cylinder 13p are engaged together, finally the upper reel 61 is mounted on the cradle 10 as the manner shown in FIG. 6. The above described effectiveness can be attained, if both the magnetic plate 70 and the positioning cylinder 13p are made of magnetic substance and either has magnetic force at least.

According to the ultrasonic-welding apparatus, which has the measurement function of the face-deflection, a series of operations, such as from the welding to the face-deflection measurement can be continuously carried out. The laser light, light flux of which forms a face parallel to the rotation axis, and which runs parallel to the welding surface, is irradiated to the predetermined position of the reel (work piece) by the transmission-type laser sensor. Thus, a plurality of the measurements, such as the distance or deflection between the flanges, the face-deflection at the vicinity of the welding surface can be achieved. Since a series of operations, such as welding and the measurement of the face-deflection, are also automatically achieved on the welding apparatus, the required manpower, workspace and tact time can be reduced.

<<Rotation Sensor for the Ultrasonic-welding Apparatus>>

The preferred embodiment of the rotation sensor for an ultrasonic-welding apparatus (hereafter defined as rotation sensor) will be explained referring to the attached drawings.

The rotation sensor according to the present invention detects whether the rotor, such as a reel or the work piece, is rotating at the time of measuring the face-deflection of the rotor, which is mounted on the cradle 10 of the ultrasonic-welding apparatus 1.

In the present embodiment, the rotor is defined as the reel, onto which a magnetic tape is wound, and placed in the magnetic tape cartridge used as recording medium, such as a computer, videotape, or the like. A detecting part is defined as a depression formed on the flange part of the reel, which winds a magnetic tape.

In the rotation sensor according to the preferred embodiment of the present invention, a reflection-type laser sensor is used as the rotation sensor, which detects the rotation of the reel by using the depression formed on the flange part of the reel. Preferably, in this embodiment, the rotation of the reel is detected by making use of the reflection of the laser light irradiated from the reflection-type laser sensor at the depression.

Figure 7:
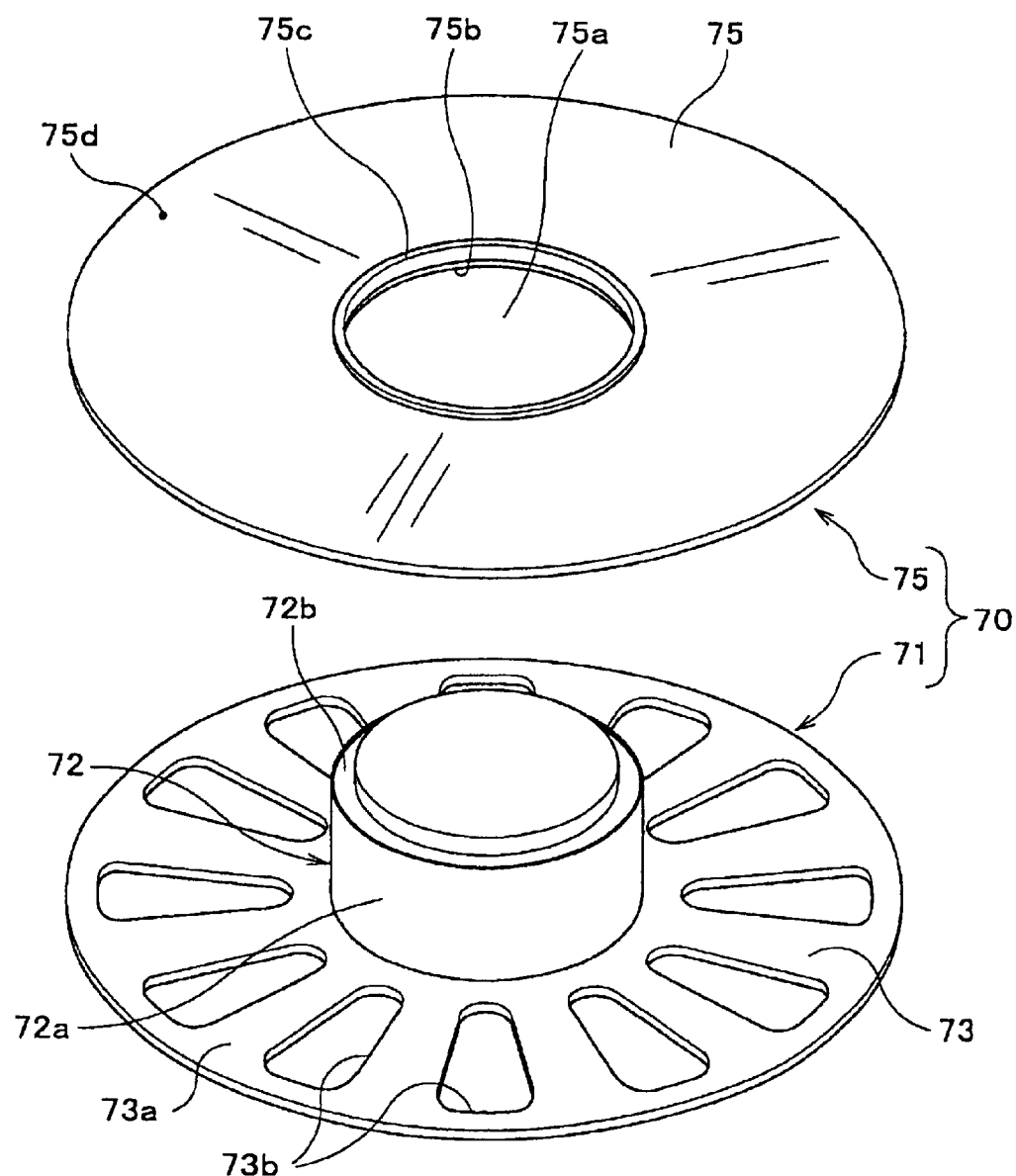
FIG. 7 is an exploded perspective view of a reel 70 placed in a magnetic tape cartridge.

The construction of a reel 70 used in the present preferred embodiment will be explained with referring to FIG. 7. FIG. 7 is an exploded perspective view of a reel 70 placed in a magnetic tape cartridge.

The reel 70 has the same composition as the reel 50 except for the depressions 73b is formed on the inside of the flange part 73. The explanation about the depressions 73b is provided in detail and the explanation about other portions are omitted here.

As shown in FIG. 7, for detecting the rotation of the reel 70, a plurality of the same shaped depressions 73b are formed on the inside 73a of the flange part 73 at equal intervals of a predetermined angle. As for the depressions 73b, the depth from inside 73a is about 0.2 mm, and it is used for escaping the air trapped between magnetic tapes when a magnetic tape are wound on the reel 70. The shape of the depression is selected after due consideration of the blazonry and the poshness of the reel 70.

Referring to the FIGS. 8 and 9, the rotation sensor for ultrasonic-welding apparatus, that is a reflection-type laser sensor device 100, will be explained. With following explanation, the parts that are practically the same as those described in the explanation of the ultrasonic-welding apparatus 1 shall be indicated with the same symbols and detailed description thereof shall be omitted.

FIG. 8 is a perspective view of showing the appearance that the rotation sensor according to the present invention is installed in the ultrasonic-welding apparatus 1. FIG. 9 is a front view showing the sensor unit 101 of a reflection-type laser sensor device 100. FIG. 10A is a graph showing the result of measurement of the reel rotation using a reflection-type laser sensor device 100, and especially showing the result of the measurement in the case that the parameter is detection distance—time: graph G1. FIG. 10B is a graph showing the result of measurement of the reel rotation using a reflection-type laser sensor device 100, and especially showing the result of the measurement in the case that the parameter is detection/not detection of the depression—time: graph G2.

A reflection-type laser sensor device 100 irradiates the laser light toward the reel 70, which is rotating on the cradle 10, and then the rotation of the reel 70 is detected by using the difference between the distance to the depression 73b and the distance to the inside 73a of the upper reel 71.

As shown in FIGS. 8 and 9, the reflection-type laser sensor device 100, which is a rotation sensor for ultrasonic-welding apparatus, is composed of a sensor unit 101 and a amplifier 102.

[Sensor Unit]

The sensor unit 101 is composed of a light emitter 101a and a light receiver 101b, both of which are placed into the case 101c. With the present preferred embodiment, the light emitter 101a is corresponding to light emitting means, and the light receiver 101b is corresponding to light-receiving means.

The sensor unit 101 is arranged, so that the axis of the run direction of the laser light, which is irradiated from the light emitter 101a, will be perpendicular to the depression 73b and the inside 73a of the flange part 73. In this location of the sensor unit 101, an emitting face 101d of the light emitter 101a and a receiving face 101e of the light receiver 101b will also be located so that both of which are face to the inside 73a and the depression 73b. In this location, furthermore, since the location of the sensor unit 101 is distant from the cradle 10, the mounting and dismounting operation can be achieved without being interfered by the sensor unit 101. Here, mounting operation is corresponding to the mounting operation of the upper reel 71 and the lower reel 75 to the cradle 10. Dismounting operation is corresponding to the dismounting operations of the reel 70 from the cradle 10.

In the present preferred embodiment, the sensor unit 101 is arranged at upward about 50 mm from external surface 76 of the lower reel 75 and also at the sideward of the welding unit 20 through the attaching flame (not shown). Accordingly, the damage is not given to the reel 70 at the time of mounting and dismounting operation.

When installing the reflection-type laser sensor device 100 to the ultrasonic-welding apparatus 1, as shown in FIG. 2, the sensor unit 101 is arranged inside of the cover 40, and the amplifier 102 is arranged at the outside of the cover 40.

[Light Emitter]

The light emitter 101a has a visible-light semiconductor laser oscillator (not shown), and emits laser light toward the depression 73b and the inside 73a of the upper reel 71 from the emitting face 101d of the case 101c. The laser light emitted from the light emitter 101a penetrates the transparent lower reel 75, and then reflected by the depression 73b or the inside 73a of the flange part 73 of the upper reel 71. The reflected laser penetrates the transparent lower reel 75 again, and then received by the receiver 101b.

The laser light emitted from the visible-light semiconductor laser oscillator of the light emitter 101a serves as a sharp luminescence spot even if the irradiating object is separated (when the distance to the reel 70 is 50 mm, the spot of the laser light is 0.3 mm in diameter). The highly precise detection is thus achieved even if detection distance is separated. The light emitter 101a is connected to the amplifier 102 for controlling the emission/stopping operation of the laser light.

[Light Receiver]

The light receiver 101b has a photo acceptance unit, such as a photodiode, and receives the laser light, which is reflected by the depression 73b or the inside 73a and reached at the receiving face 101e. The light receiver 101b detects the laser light by the photo acceptance unit, and changes it into an electrical signal. The changed electrical signal is then transmitted to the amplifier 102.

[Amplifier]

The amplifier 102 controls the emission/stopping of laser light from the light emitter 101a of the sensor unit 101, and also computes the migration length of the laser light based on the electrical signal, which is outputted from the light receiver 101b of the sensor unit 101. To be more precise, with the amplifier 102, first, the time span from the irradiation of the laser light by the light emitter 101a to the acceptance of the laser light reflected by the depression 73b or the inside 73a is measured based on the electrical signal from the light receiver 101b.

Next, the migration length of the laser light is computed using the measured time span and the irradiation rate of the laser light. Then, the computed migration length is displayed. The time span is defined as the time period expended while irradiated laser light from the light emitter 101a is received at the light receiver 101b.

The length between the emitting face 101d and the detecting object, and the length between the receiving face 101e and the detecting object may be used as the displayed migration length of the laser light (when the reel 70 is mounted on the cradle 10, the depression 73b or the inside 73a is used instead of the detecting object).

In the rotation sensor according to the present embodiment, since the length from the emitting face 101d to the detecting object is displayed on the amplifier 102, rotation of the reel 70 is detected by checking the change of the currently displayed distance. That is, when the reel 70 is rotated by the cradle 10 of the ultrasonic-welding apparatus 1, the received condition of the laser light is changed by whether or not the laser light is reflected at the depression 73b or the inside 73a. When the laser light is reflected by the depression 73b, detected migration length becomes about 0.2 mm longer than the case where the laser light is reflected by the inside 73a.

As shown in the graph G1 of the FIG. 10A, since the depression 73b is arranged at equal intervals of a predetermined angle, the detected migration length displayed on the amplifier 102 changes periodically. With the reel 70 of the present embodiment, it will become 12 periods when the reel 70 goes into a 360-degree roll. When the detected migration length displayed on the amplifier 102 is continuously changing at each intervals of fixed time (in this embodiment each 0.2 mm), it is judged that the reel 70 is rotating normally. When the detected migration length does not change or changes a lot, it is judged that the reel 70 is not rotating normally. The judgment function of the rotation of the reel 70 may be added to the amplifier 102 so that the judgement of the rotation of the reel 70 will be automatically achieved.

In the present preferred embodiment, whether or not the reel 70 is rotating is adopted as the detecting object of the reflection-type laser sensor device 100. However, the rotating speed of the reel 70 may be adopted as one of the detecting objects.

For detecting the rotating speed of the reel 70, the timewise change of the detected migration length within the predetermined time is inputted to the computers, such as a personal computer, from the amplifier 102. Then the threshold value is defined as the middle between the length from emitting face 101d to the inside 73a and the length from the depression 73b to the emitting face 101d. When the detected migration length is longer than threshold value (that is, the depression 73b is detected), codes as "1". On the other hand, when detected migration length is shorter than threshold value (that is, the depression 73b is not detected), codes as "0" (FIG. 10B). Under this condition, if the time measurement and the counting of the coded "1" are carried out in the computer, the rotating speed of the reel 70 will be computed based on the time span considering the coded "1" for twelve times.

[Function]

The function of the reflection-type laser sensor device 100 as the rotation sensor according to the present invention will be explained with referring from FIG. 8 to FIG. 10.

When the face-deflection measurement of the reel 70 is started in the ultrasonic-welding apparatus 1, the reel 70 is rotated along with the rotation of the rotating table 11, which is rotated by the stepping motor or the servo motor. About that time of rotation, the detection of the rotation of the reel 70 using the reflection-type laser sensor device 100 is started by the operation through the amplifier 102.

When the detection of the rotation of the reel 70 is started, laser light is outputted from the visible-light semiconductor laser oscillator placed in the light emitter 101a of the reflection-type laser sensor device 100, and then laser light is irradiated from the emitting face 101d. The irradiated laser light penetrates the transparent lower reel 75, and reflected by the depression 73b or the inside 73a of the flange part 73. The reflected laser light penetrates the transparent lower reel 75 again, and then reached to the receiving face 101e of the light receiver 101b.

In the light receiver 101b, laser light is received by the photo acceptance unit (not shown) and changed into an electrical signal by applying the photoelectric transfer. The changed electrical signal is transmitted to the amplifier 102. In the amplifier 102, the time span from irradiation to the acceptance of the laser light based on the inputted electrical signal is computed, and the migration length of the laser light is also computed using the measured time span and the irradiation rate of the laser light. The length between the emitting face 101d and the depression 73b or the inside 73a is further computed in the amplifier 102, the computed length is displayed thereon.

Then, whether or not the reel 70 is correctly rotating is judged based on the migration length displayed on the amplifier 102. When it is judged that the reel 70 is rotating correctly, the measurement of the face-deflection using the transmission-type laser sensor device 30 is started. on the migration length displayed on the amplifier 102. When it is judged that the reel 70 is rotating correctly, the measurement of the face-deflection using the transmission-type laser sensor devise 30 is started.

On the other hand, when it is judged that the reel 70 is not rotating correctly, the operation of the ultrasonic-welding apparatus 1 is stopped. A cause therefor is investigated and suitable disposal is performed. The detection of the rotation may be finished at before or after measuring the face-deflection. In the latter case, the detection of the rotation of the reel 70 is continued during the face-deflection measurement.

In the reflection-type laser sensor device 100, the rotation of the reel, which is covered with the cover 40, and the rotation of which can't be checked visually, can be certainly detected by irradiating the laser light in the non-contacting condition.

In the reflection-type laser sensor device 100, laser light, which can irradiate a sharp floodlighting spot even if the object (reel) is distant from, is used. Thus, the sensor unit 101 can be arranged in the position distant from the irradiating object even if the sensor unit 101 cannot be arranged in the vicinity of the reel 70 owing to the location of each unit, such as the cradle 10, the welding unit 20 or the like. Furthermore, since the depression 73b formed on the upper reel 71 is used for detecting the rotation of the reel 70, the rotation of the reel can be detected without providing the specific detecting part.

The present invention is not restricted to the above described manner, and is represented by various manners.

For example, the transmission-type laser sensor may be used as the rotation sensor instead of the reflection-type laser sensor, when the through-hole is provided on the flange part of the reel instead of the depression.

In the present embodiment, for detecting the rotation of the reel, the depression formed on the reel is used. The location of the detecting part is also not restricted to above described manner, it may be provided on the lower reel instead of the upper reel. The following compositions for detecting the rotation of the reel may be acceptable. As shown in FIG. 7, a spot 75d is provided at the downside of the lower reel 75 as the detecting part. With this construction, when the reflection-type laser sensor device 100 irradiate laser light toward the reel 70, the rotation of the reel 70 is detected by judging whether the laser light is hitting against the spot 75d.

The detecting mechanism, which indirectly rotates with the rotation of the reel through the gear, may be acceptable instead of the depression formed on the upper reel. In this case, the rotation of the reel is detected by detecting the rotation of the detecting mechanism.

In the present embodiment, the rotation sensor is applied to the ultrasonic-welding apparatus for detecting the face-deflection measurement. But application to other apparatus of the rotation sensor is also possible as long as it detect the face-deflection.

In the present preferred embodiment, laser light is used for detecting the rotation, another light sources, such as an infrared light and the like may be used instead of a laser light. If such light sources are used, rotation of the reel can be detected even from the position distant from the reel.

In the present embodiment, after judging whether or not reel is rotating correctly by the reflection-type laser sensor, the measurement of the face-deflection using the transmission-type laser sensor is started. But both measurements may be carried out at the same time.

According to the rotation sensor of the present invention, since the light sources, such as laser light, is used, the light-emitter and the light-receiver are arranged at the position distant from rotating object, and the rotation of rotating object can be checked in the non-contacting condition.

As shown in FIG. 8, in the present embodiment, the reflection-type laser sensor device 100 is used as the sensor, which detects the rotation of the reel 70 on measuring the face-deflection. However, it may be used as the sensor, which checks the interrupting part of the reel at the time of positioning of the light-emitting part 31 and the light-receiving part 32 of the transmission-type laser sensor device 30. In this case, since the interrupting part of the reel can be set always constant by using the rotation sensor as checking sensor, positioning-control accuracy can be raised more.

<<Optical Sensor for Ultrasonic-welding Apparatus>>

Referring to FIG. 11 through FIG. 14, the transmission-type laser sensor device 30, which is an optical sensor for ultrasonic-welding apparatus, will be explained below.

Figure 11:
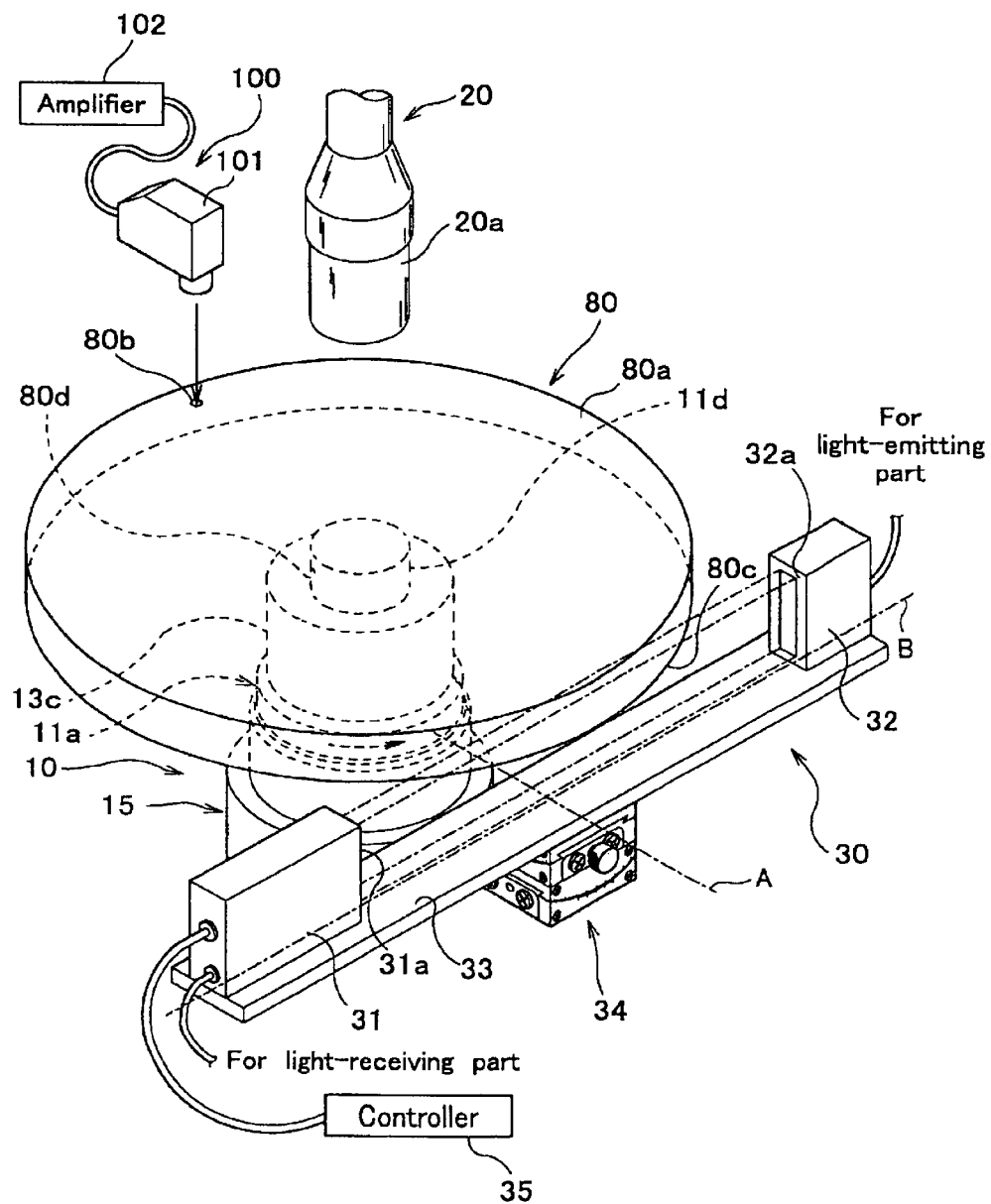
FIG. 11 illustrates an optical sensor for an ultrasonic-welding apparatus.

In FIG. 11, a disk tool (Jig) 80 is mounted on the cradle 10 instead of the reel. In the following explanation, the explanation will be carried out on regarding that the reel 50 shown in FIG. 4 is mounted on the cradle 10 instead of the disk tool 80 as occasion may demand.

The transmission-type laser sensor device 30 emits laser light towards the reel 50 which is rotating on the cradle 10, and measures the face-deflection of the reel 50 by checking the change of the shadow which is caused by the lower reel 55 and the flange part 53.

As shown in FIG. 11, the transmission-type laser sensor device 30 is composed of a light-emitting part 31, a light-receiving part 32, a connecting part 33, a swivel stage 34, and a controller 35.

In the transmission-type laser sensor device 30, for enabling the location control of the light-emitting part 31 and the light-receiving part 32 to the cradle 10 or the reel 50 mounted on the cradle 10, the light-emitting part 31 and the light-receiving part 32 are arranged on the connecting part 33. The connecting part 33 is constructed so that it can rotate around the two axes by the swivel stage 34.

As shown in FIG. 2, the light-emitting part 31, the light-receiving part 32, and the connecting part 33 of the transmission-type laser sensor device 30 are arranged inward of the cover 40. The controller 35 of the transmission-type laser sensor device 30 is arranged at the out side of the cover 40.

The transmission-type laser sensor device 30 is arranged so that the reel 50 mounted on the cradle 10 will be located between the light-emitting part 31 and the light-receiving part 32, and so that the flange part 53 of the upper reel 51 and lower reel 55 will be exposed by the laser light irradiated from the light-emitting part 31.

[Light-emitting Part]

The light-emitting part 31 has a visible-radiation semi-conductor laser-oscillation unit (not shown), and emits laser light toward the light-receiving part 32. In the light-emitting part 31, the run direction of the laser light emitted from the visible-radiation semi-conductor laser-oscillation unit is adjusted by the rotation mirror (not shown) of a polyhedron so that it runs toward the reel as a parallel light through a lens (not shown). The light-emitting part 31 is connected to the controller 35, and is controlled by the controller 35.

In the present embodiment, the laser light, the cross section of which forms the face, is served. The form of laser light is not restricted to this manner, that is, any type of the light flux such as the light flux, a cross section of which has the shape of a circle or a rectangle, may be used as long as it can irradiate the measuring part of the work piece (reel) over the whole. The laser light emitted from the light-emitting part 31 is not necessarily restricted to the mono-chromatic light, and also it is acceptable that a plurality of wavelength may be mixed to.

[Light-receiving Part]

The light-receiving part 32 has a light-receiving device and receives the laser light emitted from the light-emitting part 31. In the light-receiving part 32, the laser light from the light-emitting part 31 is condensed for the light-receiving device by a condenser lens (not shown), and the condensed laser light detected by the light-receiving device is converted into an electrical signal. The obtained electrical signal is sent to the controller 35, which is connected to the light-receiving part 32 thorough the light-emitting part 31.

[Connecting Part]

The connecting part 33, which has a plate shape, has predetermined flatness (for example, about ±5 micrometers), and at the both longitudinal end of which the light-emitting part 31 and the light-receiving part 32 are fixed, respectively, so that the light-emitting face 31a of the light-emitting part 31 will be faced to the light-receiving face 32a of the light-receiving part 32 with parallelism.

In this arrangement, the location of the reel 50 is the center of the connecting part 33 and is also at the middle between the light-emitting part 31 and the light-receiving part 32, and the laser light emitted from the light-emitting part 31 irradiates the flange part of the upper reel 51 and the lower reel 55. In this location of the light-emitting part 31 and the light-receiving part 32, parallelism is secured by fixing the light-emitting part 31 and the light-receiving part 32 to the connecting part 33, respectively. The swivel stage 34 is arranged at the longitudinal central portion of the undersurface of the connecting part 33, and supports the connecting part 33. In this location of the swivel stage 34, the connecting part 33 is rotated around the two axes by the swivel stage 34.

[Swivel Stage]

Figure 12A:
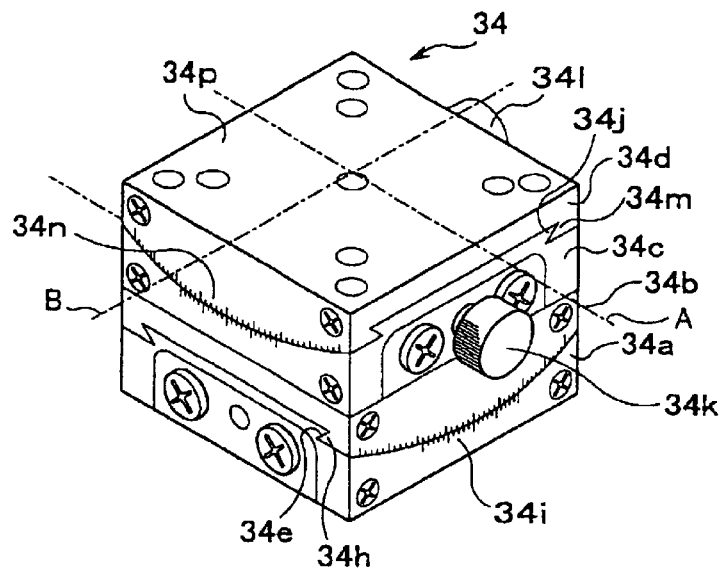
FIGS. 12A–12C illustrate the swivel stage 34 of the ultrasonic-welding apparatus, with FIG. 12A being a perspective view, FIG. 12B a front view, and FIG. 12C a rear side view.
Figure 12B:
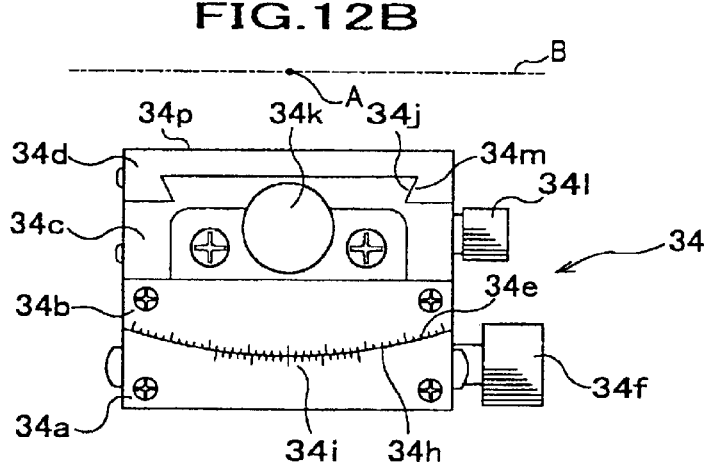
Figure 12C:
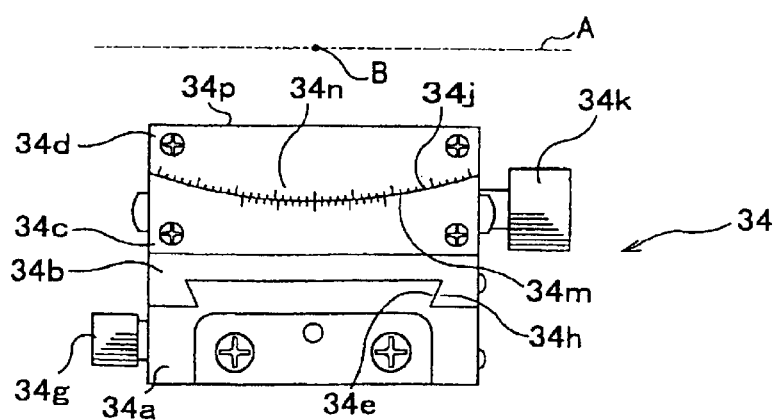

Referring to FIG. 12, the swivel stage 34 will be explained. FIG. 12A is a perspective view of the swivel stage 34. FIG. 12B is a front view of the swivel stage 34. FIG. 12C is a right-side side view of the swivel stage 34.

The swivel stage 34 is a manumotive precision stage, which moves the connecting part 33 around two axes. As shown in FIG. 12, one of two axes is an axis A, which is defined at the downside of the middle between the light-emitting part 31 and the light-receiving part 32, and which is perpendicular to the run direction of the laser light from the light-emitting part 31. When the connecting part 33 is rotated around the vertical axis A by the swivel stage 34, the light-emitting part 31 and the light-receiving part 32 are moved with the same amount in the vertical reverse direction each other.

Other of the two axes is the axis B, which is defined at the downside of the center of the width direction of the connecting part 33, and which is parallel to the run direction of the laser light from the light-emitting part 31. When the connecting part 33 is rotated around the parallel axis B by the swivel stage 34, the light-emitting part 31 and the light-receiving part 32 are tilted with same amount in the same direction.

To achieve these movements, the swivel stage 34 is composed of a first basis stage 34a, a first moving stage 34b, a second basis stage 34c, and a second moving stage 34d. In this swivel stage 34, the vertical axis A and the parallel axis B are defined in the same level surface.

The first basis stage 34a is used as the benchmark for the movement of the first moving stage 34b and is fixed on the table (not shown) of the ultrasonic-welding apparatus 1 so that the connecting part 33 may be arranged at the above described location. A rail 34e, which is engaged with the first moving stage 34b, is provided at the upper end part of the first basis stage 34a. The first moving stage 34b thus slides along the rail 34e.

As shown in FIG. 12B, the rail 34e has the arc shape centering on the vertical axis A in its front viewing. The first moving stage 34b is thus circularly slid by this arc shaped rail 34e.

A first moving handle 34f connected with the screw mechanism (not shown) for sliding the first moving stage 34b is disposed at the one side face of the first basis stage 34a (that is, the face vertical to the sliding direction of the first moving stage 34b). When the first moving handle 34f is rotated, the first moving stage 35b is thus circularly slid through the actuation of the screw mechanism. The first moving handle 34f is constructed so that it can rotate in both circular direction, for example, when the first moving handle 34f is rolled into a 360-degree, the first moving stage 34b is slid circularly at 1.2-degrees to the first basis stage 34a.

A first fixing handle 34g is disposed at the other side face of the first basis stage 34a (that is, the faces parallel to the sliding direction of the first moving stage 34b). The first moving stage 34b is fastened to the first basis stage 34a by the first fixing handle 34g.

The first moving stage 34b slides within the predetermined range (for example, within ±10 degrees) on regarding the first basis stage 34a as benchmark. An engagement part 34h, which is engaged with the rail 34e of the first basis stage 34a, is provided at the lower end of the first moving stage 34b. As shown in FIG. 12B, the engagement part 34h also has the ark shape centering on the vertical axis A.

A rotation scale 34i is provided at the side face of the first basis stage 34a and the first moving stage 34b, respectively. The degree of rotation angle can be checked by this rotation scale 34i. The vertical axis A is the central axis of rotation movement of first moving stage 34b.

The second basis stage 34c is used as the benchmark for the movement of the second moving stage 34d and is fixed on the top-face of the first moving stage 34b. A rail 34j, which is engaged with the second moving stage 34d, is provided at the upper end part of the second basis stage 34c. The second moving stage 34d thus slides along the rail 34j.

As shown in FIG. 12C, the rail 34j has the arc shape centering on the parallel axis B in its right-side viewing. The second moving stage 34d is circularly slid along the arc-shaped rail 34j.

A second moving handle 34k connected with the screw mechanism (not shown) for sliding the second moving stage 34d is disposed at the one side face of the second basis stage 34c (that is, the face vertical to the sliding direction of the second moving stage 34d). When the second moving handle 34k is rotated, the second moving stage 34d is thus circularly slid through the actuation of the screw mechanism. The second moving handle 34k is constructed so that it can rotate in both circular direction, for example, when the second moving handle 34k is rolled into 360-degree, the second moving stage 34d is slid circularly at 1.55 degrees to the second basis stage 34c.

A second fixing handle 34l is disposed at the other side face of the second basis stage 34c (that is, the face parallel to the sliding direction of the second moving stage 34d). The second moving stage 34d is fastened to the second basis stage 34c by the second fixing handle 34l.

The second moving stage 34d slides circularly within the predetermined range (for example, within ±10 degrees) on regarding the second basis stage 34c as benchmark. An engagement part 34m, which is engaged with the rail 34j of the second basis stage 34c, is provided at the lower end of the second moving stage 34d. As shown in FIG. 12C, the engagement part 34m also has an ark shape centering on the parallel axis B. The connecting part 33 is arranged at the top-surface 34p of the second moving stage 34d.

A rotation scale 34n is provided at the side face of the second basis stage 34c and the second moving stage 34d, respectively. The degree of rotation angle can be checked by this rotation scale 34n. The parallel axis B is the central axis of rotation movement of the second moving stage 34d.

[Controller]

The controller 35 controls the scanning using the laser light by controlling the rotation drive of the rotation mirror (not shown) placed in the light-emitting part 31, and also detects the light part and the shade part (laser light and shadow) of the light-receiving image, which is formed based on the electrical signal from the light-receiving part 32. The length of the light part or the shade part and/or the boundary between the light part and the shade part are set up as the detecting object in the inputting part (not shown) of the controller 35. In the output part of the controller 35, the length or the boundary which are set up as the detecting object are displayed numerically.

In the controller 35, OK/NG (all right/no good) of the result about the face-deflection measurement of the work pieces (reel) is judged based on the boundary and the length which are computed by the judgement programs, and displays the judged result, such as OK/NG, on the output part.

In the controller 35, furthermore, the setting, such as the scanning width of the laser light, and ON/OFF operation of the measurement may be carried out.

In the controller 35, in order to form a light-receiving image, the following two points are detected. One is two-dimensional position (which is the surface vertical to the run direction of the laser light) of the laser light emitted from the light-emitting part 31, and the other is whether or not the laser light from the two-dimensional position is received at the light-receiving part 32. Then, the light-receiving image is formed using the light part, which is the group of two-dimensional position where later light is received, and the shade part, which is the group of two-dimensional position where laser light is not received.

In the processor of the controller 35, the length of the light part and the shade part at the center of the width direction of a light-receiving image is computed, respectively, and boundary between the light part and the shade part is also computed. The light-receiving part 32 has the origin of the light-receiving which defines the upper limit of the received laser light, and the upper limit of the light-receiving image is defined by this origin of the light-receiving.

[Function]

When the adjustment of the light-emitting part 31 and the light-receiving part 32 are carried out, the length of the shade part is set up as the detecting object for adjusting the level of the transmission-type laser sensor device 30. The boundary between the light part and the shade part is also set up as the detecting object for adjusting the zero-point of the transmission-type laser sensor device 30. The boundary is defined as the length from the origin of the light-receiving to the upper limit of the shade part. The shade part is defined as the area by which laser light was interrupted with the disk tool 80 in light-receiving image.

Figure 14:
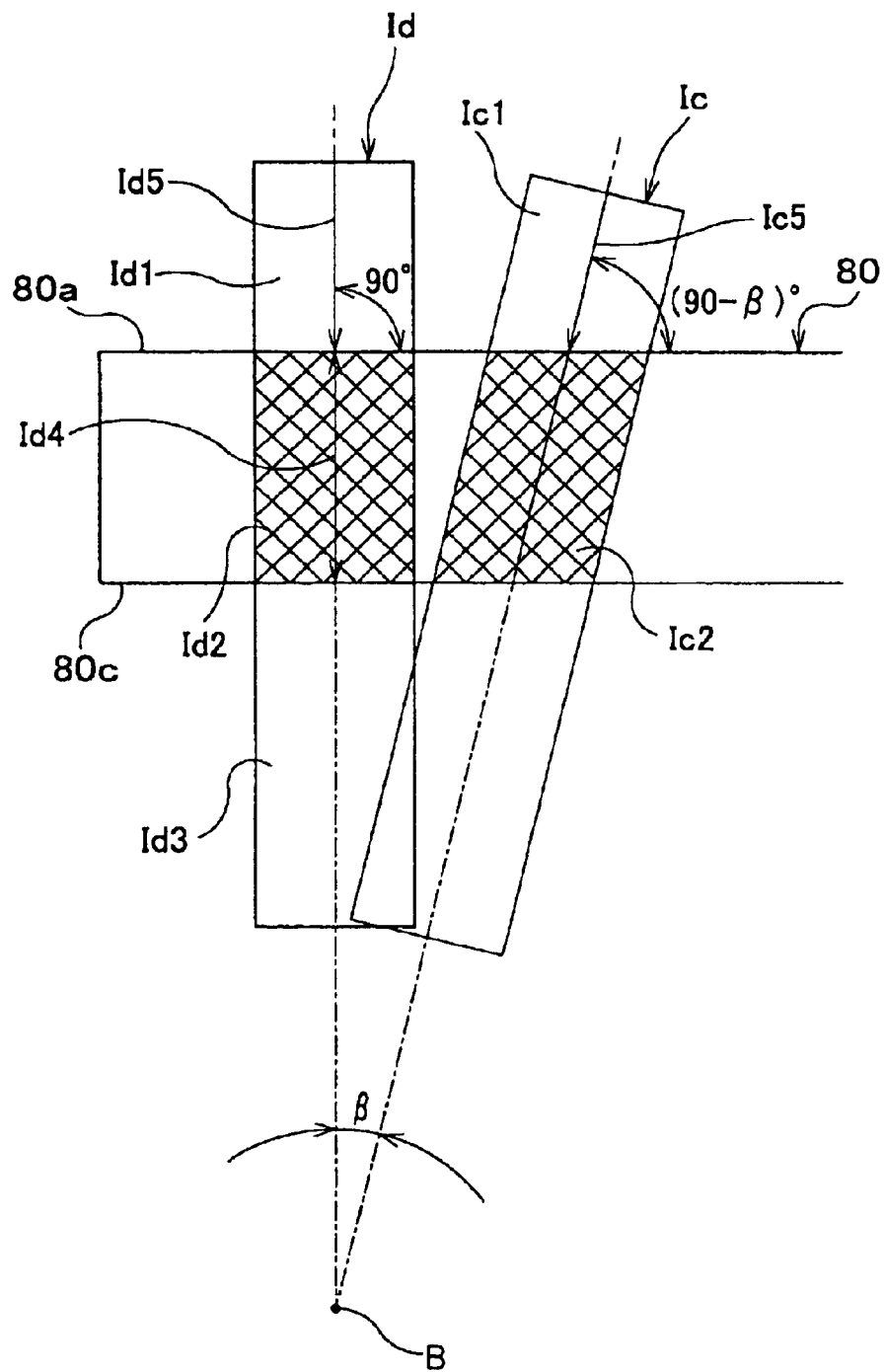
FIG. 14 illustrates the light receiving image affected by the disk tool 80.

The light-receiving image Id affected by the disk tool 80 is shown in FIG. 14. In this light-receiving image Id, the portion where is not interrupted by the disk tool 80 is defined as the light part Id1 and Id3 (shown without pattern), and the portion where is interrupted by the disk tool 80 is defined as the shade part Id2 (shown with hatching). In the controller 35, the length Id4 at the center of the width direction of the shade part Id2 is computed as the length of the shade part interrupted by the disk tool 80. The length Id5 at the center of the width direction of the light part Id1 is also computed in the controller 35 as the boundary between the light part and the light receiving part affected by the top-face 80a of the disk tool 80.

Since measurement of the face-deflection about the reel using the optical sensor according to the present invention has been already describes above, the explanation thereof is eliminated here.

<<Location Controlling Method>>

A Location controlling method of the optical sensor for ultrasonic-welding apparatus will be explained as follows. In the present preferred embodiment of the adjusting method, the disk tool 80 is used for adjusting the locating condition of the light-emitting part 31 and the light-receiving part 32 of the transmission-type laser sensor device 30 (FIG. 11).

[Disk Tool]

The disk tool 80 has nearly same thickness and diameter as the above described reel 50 and has the predetermined flatness (for example, ±5 micrometers). The disk tool 80 also has a disk shape, and made of the opaque materials for preventing the penetration of the laser light. A tiny spot 80b (about 10 micrometers in diameter) is formed on top-face 80a of the disk tool 80, and is used for the location control of the reel 50, the light-emitting part 31, and the light-receiving part 32. The location control of these components is carried out so that the laser light from the reflection-type laser sensor device 100 may hit tiny spot 80b. An engaging hole 80d, into which the positioning cylinder 11d of the cradle 10 is engaged, is provided at the center of undersurface 80c of the disk tool 80.

In the present preferred embodiment, for adjusting the level of the transmission-type laser sensor device 30, the following two points are set up as detecting objects. One of two detecting objects is the length of the shade part, which is caused by the interruption of the disk tool 80. Other detecting object is the boundary between the light part and the shade part (the length from the origin of the light-receiving to the upper limit of the shade part), which is used for adjusting the zero-point of the transmission type laser sensor device 30.

[Standard Disk Thickness and Standard Zero-point]

Referring to FIG. 11 through FIG. 14, the standard disk thickness used at the level adjusting process of the location controlling method according to the present invention, and the standard zero-point used at a zero-point adjusting process of the location controlling method according to the present invention.

Figure 13:
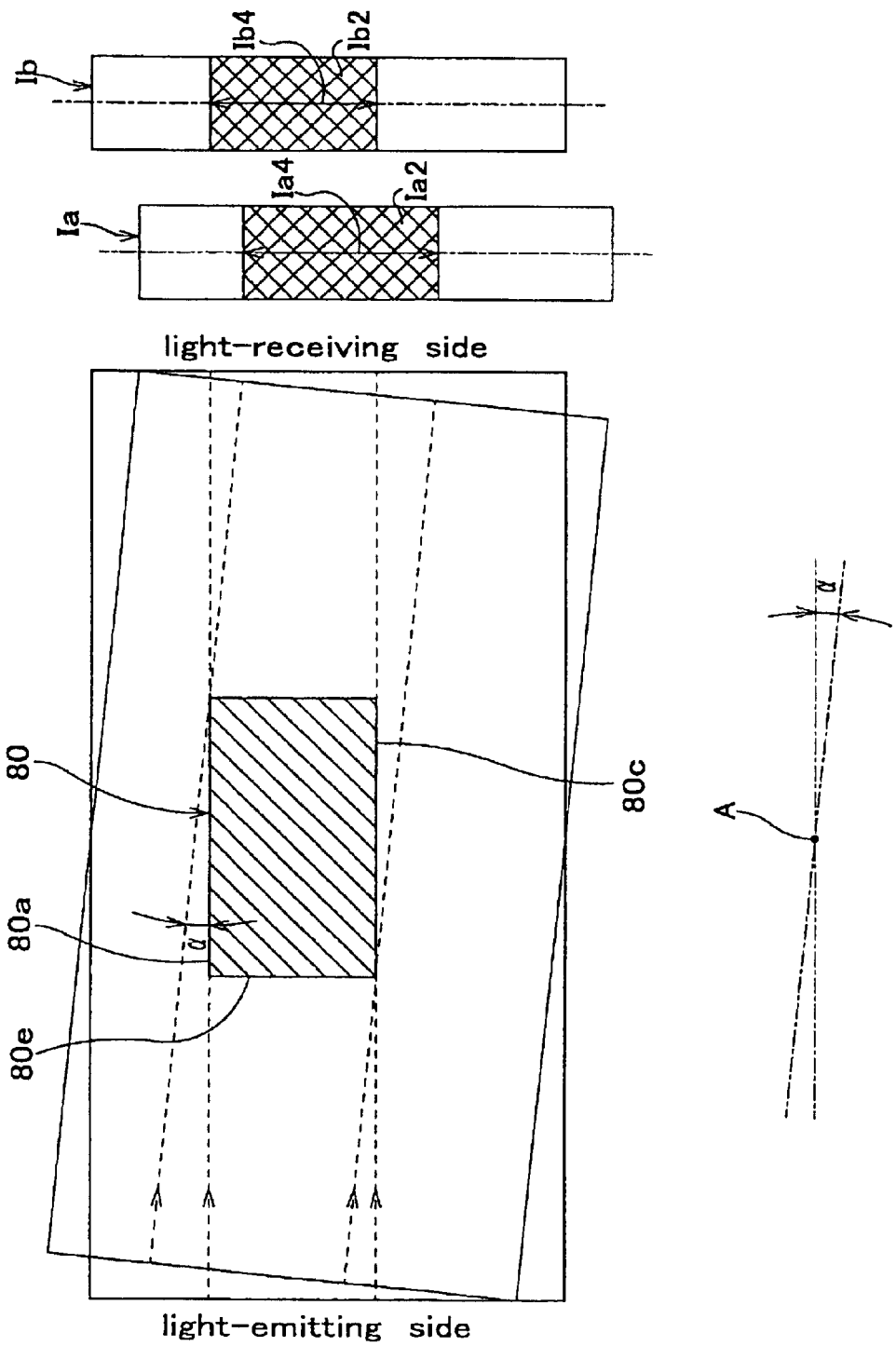
FIG. 13 is a pattern diagram showing the change of the light emitting range and the light receiving range of the laser light of the transmission-type laser sensor device 30, and the relation between the disk tool 80 and the light-reviewing image Ia and Ib affected by the disk tool 80, when the connecting part 33 is rotated around the vertical axis A by the swivel stage 34.

The standard disk thickness and the standard zero-point are set up when the transmission-type laser sensor device 30 is established in the ultrasonic-welding apparatus 1. FIG. 13 is a pattern diagram showing the change of the light-emitting range and the light-receiving range of the laser light of the transmission-type laser sensor device 30, and the relation between the disk tool 80 and the light-receiving image Ia and Ib affected by the disk tool 80, when the connecting part 33 is rotated around the vertical axis A by the swivel stage 34.

FIG. 14 is a pattern diagram showing the relation between the disk tool 80 and the light-receiving image Ic and Id affected by the disk tool 80, when the connecting part 33 is rotated around the parallel axis B by the swivel stage 34.

After the ultrasonic-welding apparatus 1 is established, the swivel stage 34, the connecting part 33, the light-emitting part 31, and the light-receiving part 32 of the transmission-type laser sensor device 30 are arranged at the predetermined position of the ultrasonic-welding apparatus 1. Following to this arrangement, the reflection-type laser sensor device 100 is arranged. At this time, the cradle 10, the swivel stage 34, and the connecting part 33 are arranged using the level so that the levelness of them are achieved.

Then, the disk tool 80 is mounted on the cradle 10 by engaging the engaging hole 80d of the disk tool 80 with the positioning cylinder 13 of the cradle 10, so that the laser light irradiated from the reflection-type laser sensor device 100 hits the tiny spot 80b formed on the top-face 80a of the disk tool 80. In the controller 35, the length of the shade part corresponding to the thickness of the disk tool 80 and the boundary between the light part and the shade part corresponding to position of the top-face 80a of the disk tool 80 are set up as the detection object.

[Setup of Standard Disk Thickness]

Next, the setup of standard disk thickness is carried out. The length of the shade part of the light-receiving image is checked by the display of the controller 35, while carrying out minute rotation of the first moving handle 34f of the swivel stage 34. Then, the angle indicated by the rotation scale 34i and the length of the shade part are recorded together. This recording is carried out within the limits of a predetermined angle (for example, ±5 degrees) centering on the position 0 degree of the rotation scale 34i. The shade part having the shortest length within recorded length of the shade part is selected, and the angle corresponding to the selected shade part is also selected.

Then, adjusting to the selected angle by rotating the first moving handle 34f, and then fasten the first moving stage 34b by fastening the first fixing handle 34g. The length of the selected shade part having the most shortest length is stored as the standard disk thickness, which is corresponding to the standard of the level in the transmission-type laser sensor device 30 (the length of the shade part Ib4 of the of the light-receiving image Ib shown in FIG. 13).

[Set Up of the Standard Zero Point]

Next, the setup of the standard zero-point is carried out. As described above, each part of the ultrasonic-welding apparatus 1 and the transmission-type laser sensor device 30 are arranged with levelness. The light-emitting part 31 and the light-receiving part 32 are arranged having the perpendicularity to the top-face 80a and the undersurface 80c of the disk tool 80. Then, the boundary between the light part and the shade part at this time is recorded as the standard zero-point (the boundary Id5 of the light-receiving image shown in FIG. 14), which is the zero-point in the transmission-type laser sensor device 30.

The relation between the light-receiving image and the standard disk thickness will be explained using the pattern diagram shown in FIG. 13. When the connecting part 33 is rotated around the vertical axis A by the first moving handle 34f, the light-emitting part 31 and the light-receiving part 32 are moved with same amount at the vertical reverse direction. Then, as shown in FIG. 13, the light-emitting range and the light-receiving range are also moved to the vertical reverse direction, and the incident-angle of the laser light toward the disk tool 80 is changed.

When laser light runs parallel to top-face 80a and undersurface 80c of the disk tool 80 (when the height location of the light-emitting part 31 and the light-receiving part 32 is same), the light-receiving image Ib will be given. Thus, the length of the shade part Ib4 is equivalent to the thickness of the disk tool 80. On the other hand, when laser light does not run parallel to top-face 80a and undersurface 80c of the disk tool 80, (when the height location of the light-emitting part 31 and the light-receiving part 32 is not same), the light-receiving image Ia will be given. Thus, the length of the shade part Ia4 becomes longer than the thickness of the disk tool 80.

That is, the standard disk thickness is corresponding to the length of the shade part of the light-receiving image when the light-emitting part 31 and the light-receiving part 32 is arranged so that laser light will run parallel to the top-face 80a and undersurface 80c of the disk tool 80.

The relation between the light-receiving image and the standard zero-point will be explained using the pattern diagram shown in FIG. 14. When the connecting part 33 is rotated around the parallel axis B by the second moving handle 34k, the light-emitting part 31 and the light-receiving part 32 are moved with same amount in the same direction. Then, as shown in FIG. 14, the light-emitting range and the light-receiving range are also moved to the same direction, and the angle of the central axis of the light-receiving image is changed around the parallel axis B.

When the central axis of a light-receiving image is perpendicular to the top-face 80a and undersurface 80c of the disk tool 80 (when the light-emitting part 31 and the light-receiving part 32 are vertically arranged to the top-face 80a and the undersurface 80c of the disk tool 80), the light-receiving image Id will be given. Thus, the boundary Id5 becomes longer. On the other hand, when the central axis of a light-receiving image is not perpendicular to top-face 80*a* and undersurface 80*c* of the disk tool 80 (when the light-emitting part 31 and the light-receiving part 32 are not vertically arranged to the top-face 80*a* and the undersurface 80*c* of the disk tool 80), the light-receiving image Ic will be given. Thus, the boundary Ic5 becomes shorter.

That is, the standard zero-point corresponded to the length from the origin of the light-receiving image to the upper limit of the shade part, when the light-emitting part 31 and the light-receiving part 32 are arranged so that the central axis of the light-receiving image may become perpendicular to the top-face 80*a* and the undersurface 80*c* of the disk tool 80.

The preferred embodiment of the adjusting method of the optical sensor according to the present invention will be explained with reference to the attached drawings. In the present adjusting method, first, the relative height location of light-emitting means and light-receiving means is adjusted so that the thickness of the adjusting member in the light-receiving image may be accord with the standard thickness within the first adjusting process. Next, the inclination of the light-emitting means and the light-receiving means for adjusting means are adjusted so that the edge position of the adjusting member in a light-receiving image may turn into the standard position within the second adjustment process.

[Flow of the Location Controlling Method]

As the adjusting method of the optical sensor for the ultrasonic-welding apparatus, the adjusting method of the transmission-type laser sensor, that is, the method for adjusting the location of the light-emitting part 31 and the light-receiving part 32 of the transmission-type laser sensor device 30, will be explained along the flow chart of FIG. 15. FIG. 15 is a flow chart explaining the method for adjusting the location of the light-emitting part 31 and the light-receiving part 32 of the transmission-type laser sensor device 30.

When the ultrasonic-welding apparatus us operated and the reel 50 is manufactured, the face-deflection measurement of the reel 50 is carried out. In order to maintain the measurement accuracy of face-deflection measurement of the reel 50 for high accuracy, location control of the light-emitting part 31 and the light-receiving part 32 of the transmission-type laser sensor device 30 is carried out every predetermined terms, for example, every one weeks.

In this location control, first, the control of the first moving stage 34*b* is carried out within the level adjusting process, next, the control of the second moving stage 34*d* is carried out within the zero-point adjusting process. As a result of these controls, the location control of the light-emitting part 31 and the light-receiving part 32 is achieved.

In the preferred embodiment of the present invention, the level adjusting process is corresponding to the first adjusting process, and the zero-point adjusting process is corresponding to the second adjusting process.

First, the disk tool 80 is mounted on the cradle 10 of the ultrasonic-welding apparatus 1. At this time, the disk tool 80 is mounted so that laser light irradiated from the reflection-type laser sensor device 100 will hit the tiny spot 80*b* formed on the top-face 80*a* of the disk tool 80. According to this arranging manner of the disk tool 80, laser light is interrupted in the same point as the time of determining the standard disk thickness and the standard zero-point.

After the disk tool 80 is mounted, the level adjusting process is started. First, the first moving stage 34*b* is let to the movable condition by loosing the first fixing handle 34*g* of the swivel stage 34.

Next, the connecting part 33 is rotated around the vertical axis A by the slight rotation of the first moving handle 34*f* of the swivel stage 34, and thus the light-emitting part 31 and the light-receiving part 32 are rotated relatively (S1). Checking the length of the shade part of the light-receiving image by the display of the controller 35 at each slight rotation (S2). Judging whether the length of the shade part, which is checked at step 2(S2), is in agreement with the standard disk thickness (S3). The operation through step 1(S1) to step 3(S3) is repeated until the length of the shade part will be in agreement with the standard disk thickness.

When the length of the shade part, which is checked at step 2 (S2), is in agreement with the standard disk thickness, the first moving stage 34*b* is fastened by fastening the first fixing handle 34*g* of the swivel stage 34 (S4). Location of the light-emitting part 31 and the light-receiving part 32 are thus adjusted so that the laser light from the light-emitting part 31 may become parallel to the top-face 80*a* and the undersurface 80*c* of the disk tool 80.

When the incident-angle of the laser light toward the disk tool 80 is shifted at angle $\alpha$ around the vertical axis A as shown in FIG. 13, since the laser light from the light-emitting part 31 hits at angle $\alpha$ to the top-face 80*a* of the disk tool 80, the top-face 80*a* is also contained as the interrupting part of the disk tool 80.

The length of the shade part Ia4 of the light-receiving image Ia thus becomes longer than the standard disk thickness. When the angle á is approached to angle 0 by the rotation of the first moving handle 34*f*, the shading range of the disk tool 80 becomes smaller, and thus the length of the shade part of the light-receiving image becomes shorter. When angle $\alpha$ becomes angle 0, only the side-face 80*e* of the disk tool 80 becomes the interrupting part. Thus, the length of the shade part of the light-receiving image becomes same as the length of the shade part Ib4 of the light-receiving image Ib, and is in agreement with standard disk thickness.

After level adjusting process, the zero-point adjusting process is carried out. First, the second moving stage 34*d* is let to the movable condition by loosing the second fixing handle 34*l* of the swivel stage 34. Next, the connecting part 33 is rotated around the parallel axis B by the slight rotation of the second moving handle 34*k* of the swivel stage 34, and thus the light-emitting part 31 and the light-receiving part 32 are rotated in the same direction (S5). Checking the boundary of the light part and the shade part of the light-receiving image by the display of the controller 35 at every slight rotation (S6). Then judging whether the boundary, which is checked at step 6 (S6), is in agreement with the standard zero-point (S7). The operation through step 5 (S5) to step 7 (S7) is repeated until the boundary of the shade part will be in agreement with the standard zero-point.

When the boundary, which is checked at step 6 (S6), is in agreement with the standard zero-point, the second moving stage 34*d* is fastened by fastening the second fixing handle 34*l* of the swivel stage 34 (S8). Location control of the light-emitting part 31 and the light-receiving part 32 are thus achieved so that the central axis of the light-receiving image may become vertical to the top-face 80*a* and the undersurface 80*c* of the disk tool 80.

When the location of the transmission-type laser sensor device 30 is shifted at angle $\beta$ around the parallel axis B as shown in FIG. 14, since the central axis of the light-receiving image becomes angle $(90-\beta)$ to the top-face 80*a* and the undersurface 80*c* of the disk tool 80, the origin of the light-receiving image is approached to the upper limit of the shade part.

The boundary Ic5 of the light-receiving image Ic thus becomes shorter than the standard zero-point. When the angle $\beta$ is approached to angle 90 degree by the rotation of the second moving handle 34k, the angle to the top-face 80a and the undersurface 80b of the disk tool 80 of a light-receiving image approaches to angle 90 degree, and then the length of the boundary of the light-receiving image becomes longer.

The central axis of the light-receiving image then becomes 90 degrees to top-face 80a and undersurface 80b of the disk tool 80. Consequently, the boundary of the light-receiving image turns into the boundary Id5 of the light-receiving image Id, and is in agreement with the standard zero-point.

In the present adjusting method of the transmission-type laser sensor device 30, the relative height location of light-emitting part 31 and light-receiving part 32 to the disk tool 80 are adjusted by the level adjusting process. The incline of the light-emitting part 31 and the light-receiving part 32 to the disk tool 80 are adjusted by the zero-point adjusting process.

In this adjusting method, the light-emitting part 31 and the light-receiving part 32 are adjusted to the same location as the time of setting of the standard disk thickness and the standard zero-point. The measurement accuracy of the face-deflection to the reel 50 by the transmission-type laser sensor device 30 is maintained with high precision. Furthermore, since the interrupting part of the disk tool 80 is fixed using the spot 80b and the reflection-type laser sensor device 100, location control is achieved with high precision.

In the present embodiment, for adjusting the zero-point of the transmission-type laser sensor, the boundary between the light part and the shade part of the top-face of the disk tool is used as the detecting object. However, the boundary between the light part and the shade part of the under-surface may be used as the detecting object.

In the present embodiment, the light-emitting part and the light-receiving part are rotated relatively around the tow-axes by the swivel stage and the connection part. If the connection part can not be arranged, another components which can rotate the light-receiving part and the light-emitting part relatively may be acceptable.

In the present embodiment, the disk tool, which has about same size as the reel, is used as the adjusting member. Another tools, such as plate-formed tolls having a certain amount of thickness and width, may be used instead of the above described disk tool.

In the present embodiment, since the location adjustment of the disk tool is achieved using the spot of the disk tool, laser light was interrupted only in the specific shade part of the disk tool. If the disk tool has the very highly precise flatness, it is not necessary to pinpoint the shade part of the disk tool.

In the present embodiment, set up of the standard disk thickness and the standard zero-point are achieved previously.

The following manners may be acceptable. That is the first moving stage is fixed at the angle to which the length of the shade part of the light-receiving image becomes the shortest in the level adjusting process. The second moving stage is fixed at the angle to which the length from the origin for the light-receiving to the upper limit of the shade part (boundary between the light part and the shade part) in the zero adjustment process.

Moreover, when the moving handle of the swivel stage is connected to the actuator, such as the stepping motor, the movement of the swivel stage may be automatically carried out through the control unit which controls overall controller of the transmission-type laser sensor and the stepping motor.

In the present embodiment, two axes are defined in the lower side of the light-emitting part and the light-receiving part. However, another defining manner, for example, the range scanned by laser light from the light-emitting part, or the upper side of the light-emitting part and the light-receiving part may be acceptable.

According to the adjusting method of the optical sensor, the relative height location of the light-emitting mean and the light-receiving to the adjusting member can be adjusted by the first adjusting process. The inclination of the light-emitting mean and the light-receiving to the adjusting member can be adjusted by the second adjusting process. Thus, when the adjustment of the optical sensor is carried out with the present invention's manner, the optical sensor, which has sufficient detecting accuracy to the detecting object, can be supplied.

What is claimed is:

1. A rotation sensor, in combination with an ultrasonic-welding apparatus, which detects the rotation of a rotor comprising:

a cradle, which holds and rotates the rotor;

an ultrasonic horn disposed so as to face said cradle, and cooperate with said cradle to hold the rotor during a welding operation;

light-emitting means, which emits a light to a detecting object which rotates with the rotation of said rotor, light-receiving means, which receives the light emitted from said light-emitting means.

2. A rotation sensor in combination with an ultrasonic-welding apparatus according to claim 1, wherein said light-emitting means and light-receiving means are disposed so as to face the detecting object formed on said rotor, and the light-emitting means emits light onto said detecting object.

3. A rotation sensor in combination with an ultrasonic welding apparatus according to claim 1, wherein said detecting object is a depression formed on said rotor, and said light-receiving means receives the light, which is emitted from said light-emitting means and reflected by said depression.

4. A rotation sensor in combination with an ultrasonic-welding apparatus according to claim 1, wherein said detecting object is a hole formed on said rotor, and said light-receiving means receives the light, which is passed through said hole.

5. A rotation sensor in combination with an ultrasonic-welding apparatus according to claim 1, wherein said rotor is a reel for winding a magnetic tape, and said detecting object is a depression, which is formed on the inside of the flange part of said reel for allowing air to escape from between layers of the tape as the tape is wound on the reel.

6. A detecting method of the rotation of a rotor using a rotation sensor, for an ultrasonic-welding apparatus, which is composed of light-emitting means and light-receiving means, comprising:

rotating a rotor on a cradle after the rotor has been released from engagement between the cradle and an ultrasonic horn;

emitting a light from said light-emitting means to a detecting object which rotates with the rotation of said rotor;

receiving, with said light-receiving means, the light emitted from said light-emitting means; and detecting rotation of the rotor based on the time period expended while the irradiated light from the light-emitting means is received at said light-receiving means.

* * * * *